United States Patent
Davison et al.

(10) Patent No.: US 8,683,028 B2
(45) Date of Patent: Mar. 25, 2014

(54) GENERIC MULTI-LAYER PROVISIONING SERVICE MANAGEMENT LAYER SYSTEMS AND METHODS

(75) Inventors: Eric Stewart Davison, Peppard Common (GB); Chandrashekar Lalapet Srinivas Prasanna, Ottawa (CA)

(73) Assignee: Ciena Corporation, Hanover, MD (US)

( * ) Notice: Subject to any disclaimer, the term of this patent is extended or adjusted under 35 U.S.C. 154(b) by 110 days.

(21) Appl. No.: 13/416,009

(22) Filed: Mar. 9, 2012

(65) Prior Publication Data

US 2013/0238774 A1    Sep. 12, 2013

(51) Int. Cl.
   *G06F 15/173*    (2006.01)

(52) U.S. Cl.
   USPC ............. 709/223; 709/217; 709/229

(58) Field of Classification Search
   USPC ........... 709/223, 224, 217, 219, 229
   See application file for complete search history.

(56) References Cited

U.S. PATENT DOCUMENTS

| | | | |
|---|---|---|---|
| 7,761,543 B2* | 7/2010 | Hyndman et al. | 709/223 |
| 7,889,644 B2* | 2/2011 | Su et al. | 370/230 |
| 8,099,472 B2* | 1/2012 | Mahaffey et al. | 709/217 |
| 8,254,285 B2* | 8/2012 | Siddha et al. | 370/254 |
| 2002/0091636 A1* | 7/2002 | Carroll Bullard | 705/40 |
| 2004/0057464 A1* | 3/2004 | Sanders | 370/469 |
| 2005/0041583 A1* | 2/2005 | Su et al. | 370/235 |
| 2005/0120160 A1* | 6/2005 | Plouffe et al. | 711/1 |
| 2005/0246443 A1* | 11/2005 | Yao et al. | 709/227 |
| 2006/0090136 A1* | 4/2006 | Miller et al. | 715/734 |
| 2009/0003333 A1 | 1/2009 | Davison et al. | |
| 2009/0003337 A1 | 1/2009 | Daines et al. | |
| 2009/0010180 A1* | 1/2009 | Xue et al. | 370/254 |
| 2009/0265698 A1* | 10/2009 | Connolly et al. | 717/168 |
| 2010/0034115 A1 | 2/2010 | Busch | |
| 2010/0039935 A1 | 2/2010 | Davison et al. | |
| 2010/0309924 A1* | 12/2010 | Harrison et al. | 370/401 |
| 2010/0332630 A1* | 12/2010 | Harlow | 709/221 |

* cited by examiner

*Primary Examiner* — Lashonda Jacobs
(74) *Attorney, Agent, or Firm* — Clements Bernard PLLC; Christopher L. Bernard; Lawrence A. Baratta, Jr.

(57) ABSTRACT

Network planning/provisioning systems and methods with a Generic Multi-Layer Provisioning (GMLP) service management layer that is configured to operate on any of deployed network elements and spoofed network elements to provide abstract service modeling thereon. The GMLP layer may include a spoofing engine configured to simulate network elements and provisioning functions associated therewith. The associated abstraction of the GMLP layer enables layer 0-4 topologies and services to be modeled, planned, and provisioned.

15 Claims, 23 Drawing Sheets

GENERIC MULTI-LAYER PROVISIONING SERVICE MANAGEMENT LAYER SYSTEMS AND METHODS

FIELD OF THE INVENTION

Generally, the field of art of the present disclosure pertains to networking systems and methods, and more particularly, to network planning/provisioning systems and methods with a Generic Multi-Layer Provisioning (GMLP) service management layer configured to operate on any of deployed network elements and spoofed network elements to provide abstract service modeling thereon.

BACKGROUND OF THE INVENTION

Conventionally, element management systems (EMS) provide fault, configuration, accounting, performance, and security (FCAPS) functionality. These systems discover and maintain a database of physical components (e.g., links, ports, devices) and logical components (e.g., virtual local area networks (VLANs), link aggregation). Management systems may then be used to configure certain physical and logical components to configure services. Configuration is often accomplished via configuration templates, command line interface (CLI) scripting, and service activation tasks, such as provisioning wizards. Disadvantageously, some existing management platforms require network elements to be physically present and available. Of note, with some management platforms, it may take significant periods of time to recover subsequent to the unavailability of one or more network elements. Some management platforms, on the other hand, just consider some devices unreachable. However, a common constraint is that network elements must exist in the network.

BRIEF SUMMARY OF THE INVENTION

In an exemplary embodiment, a planning system includes a processing device including a generic multi-layer provisioning service management layer configured to operate on any of deployed network elements and spoofed network elements to provide abstract service modeling thereon; wherein the generic multi-layer provisioning service management layer is communicatively coupled to a user interface and a management system. The generic multi-layer provisioning service management layer may include a spoofing engine configured to simulate network elements and provisioning functions associated therewith. The generic multi-layer provisioning service management layer may include a Service Abstraction Layer; a Transport/Protocol Abstraction Layer; and a Hardware Abstraction Layer. The Service Abstraction Layer may be configured to interface through the user interface to provide creation of end-to-end services through an abstract model of termination points. The Transport/Protocol Abstraction Layer may be configured to interface between the Service Abstraction Layer and the Hardware Abstraction Layer to enable creation of services independent of underlying transport connectivity, protocols, and encapsulations. The Hardware Abstraction Layer may be configured to interface to the management system to gather network element information therefrom and to form an abstract model of each network element including termination points, system nodes, links, and aggregations. The generic multi-layer provisioning service management layer may include a Service Associated Object-Oriented Relational Database providing a relational repository for services, tunnels, and device specific attributes. The spoofing engine may be configured to intercept any request between the Service Abstraction Layer, the Transport/Protocol Abstraction Layer, and the Hardware Abstraction Layer related to the spoofed network elements and to provide an appropriate response thereto. The generic multi-layer provisioning service management layer may include a Transaction Language-1 and Simple Network Management Protocol library providing device discovery. The generic multi-layer provisioning service management layer may be configured to model networking components including connectivity group components, protection type components, service type components, and resource tracking components. The connectivity group components may utilize graph theory for building blocks of connectivity objects with the objects including one of an Order 2 object and an Order !2 object. The generic multi-layer provisioning service management layer may be configured to provision a Carrier Ethernet service.

In another exemplary embodiment, a network system includes a planning/provisioning system; a management system communicatively coupled to the planning/provisioning system; at least one network element communicatively coupled to the management system; and at least one spoofed network element managed in the planning/provisioning system; wherein the planning/provisioning system is configured to implement a generic multi-layer provisioning service management layer configured to operate on the at least one network element and the at least one spoofed network element to provide abstract service modeling thereon. The generic multi-layer provisioning service management layer may include a Service Abstraction Layer; a Transport/Protocol Abstraction Layer; and a Hardware Abstraction Layer. The generic multi-layer provisioning service management layer may include a spoofing engine configured to simulate network elements and provisioning functions associated therewith. The Service Abstraction Layer may be configured to interface through the user interface to provide creation of end-to-end services through an abstract model of termination points. The Transport/Protocol Abstraction Layer may be configured to interface between the Service Abstraction Layer and the Hardware Abstraction Layer to enable creation of services independent of underlying transport connectivity, protocols, and encapsulations. The Hardware Abstraction Layer may be configured to interface to the management system to gather network element information therefrom and to form an abstract model of each network element including termination points, system nodes, links, and aggregations. The generic multi-layer provisioning service management layer may be configured to provision a Carrier Ethernet service.

In yet another exemplary embodiment, a network planning method includes obtaining information from a management system related to deployed network elements; spoofing at least one network element; abstracting each of the deployed network elements and the at least one spoofed network element through a plurality of managed objects; and performing service modeling on the deployed network elements and the at least one spoofed network through the plurality of managed objects.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

Figure 1:
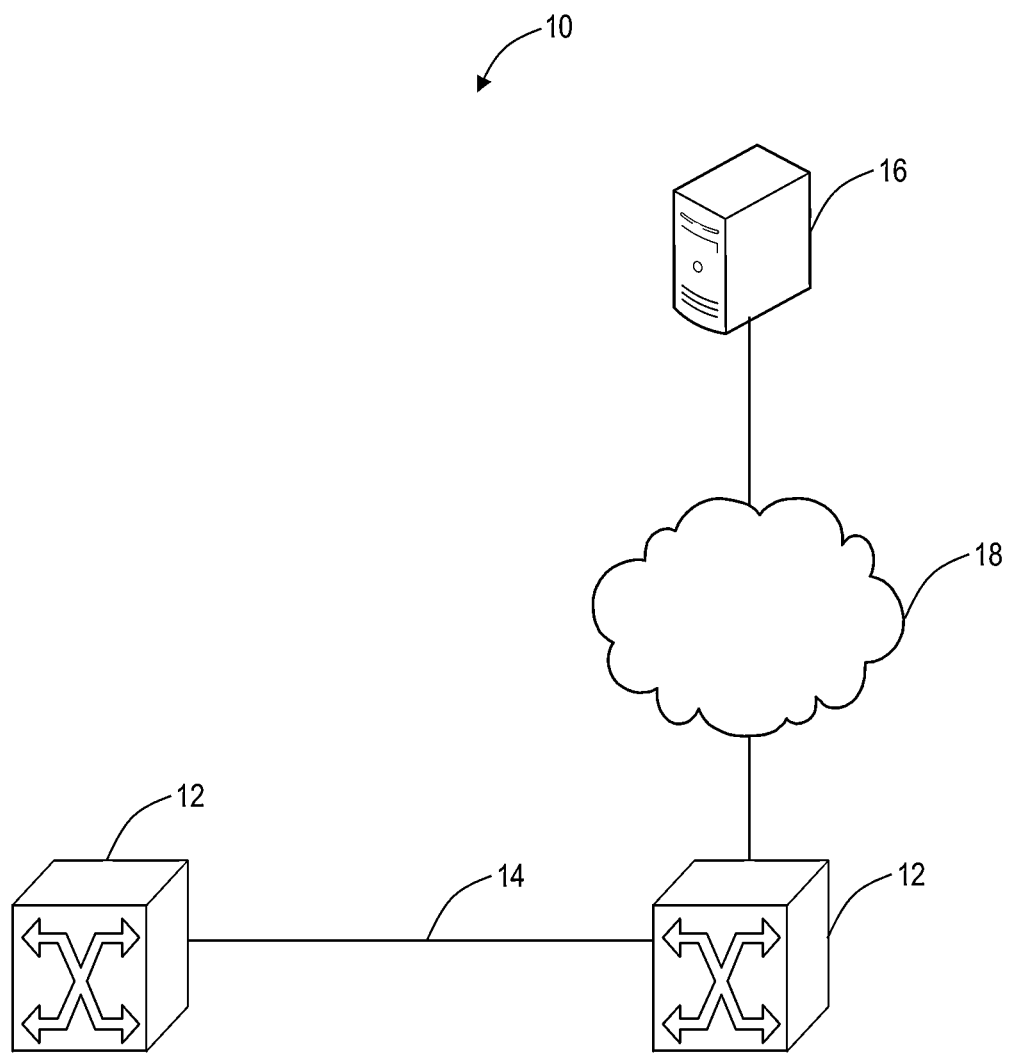
FIG. 1 is a network diagram of a Carrier Ethernet network with two network elements interconnected therebetween by a link.

Referring to FIG. 1, in an exemplary embodiment, a Carrier Ethernet network 10 includes two network elements 12 interconnected therebetween by a link 14. Further, the network elements 12 are communicatively coupled to a management system 16 via a network 18. As described herein, Carrier Ethernet is a general term utilized to cover extensions to Ethernet for carrier level service. For example, these extensions may include Operations, Administration, and Maintenance (OAM), standardized services (e.g., E-Line, E-LAN, etc.), ITU-R G.8032v1 and v2 "Ethernet Shared Protection Rings," the contents of which are herein incorporated by reference, and the like. The Metro Ethernet Forum (MEF, metroethernetforum.org) is involved in defining standards for Carrier Ethernet. Conceptually, Carrier Ethernet includes both a service delivery function and a network management function. Thus, the Carrier Ethernet network 10 includes both the network elements 12 (i.e. for service delivery) and the management system 16 (i.e. for network management).

Figure 2:
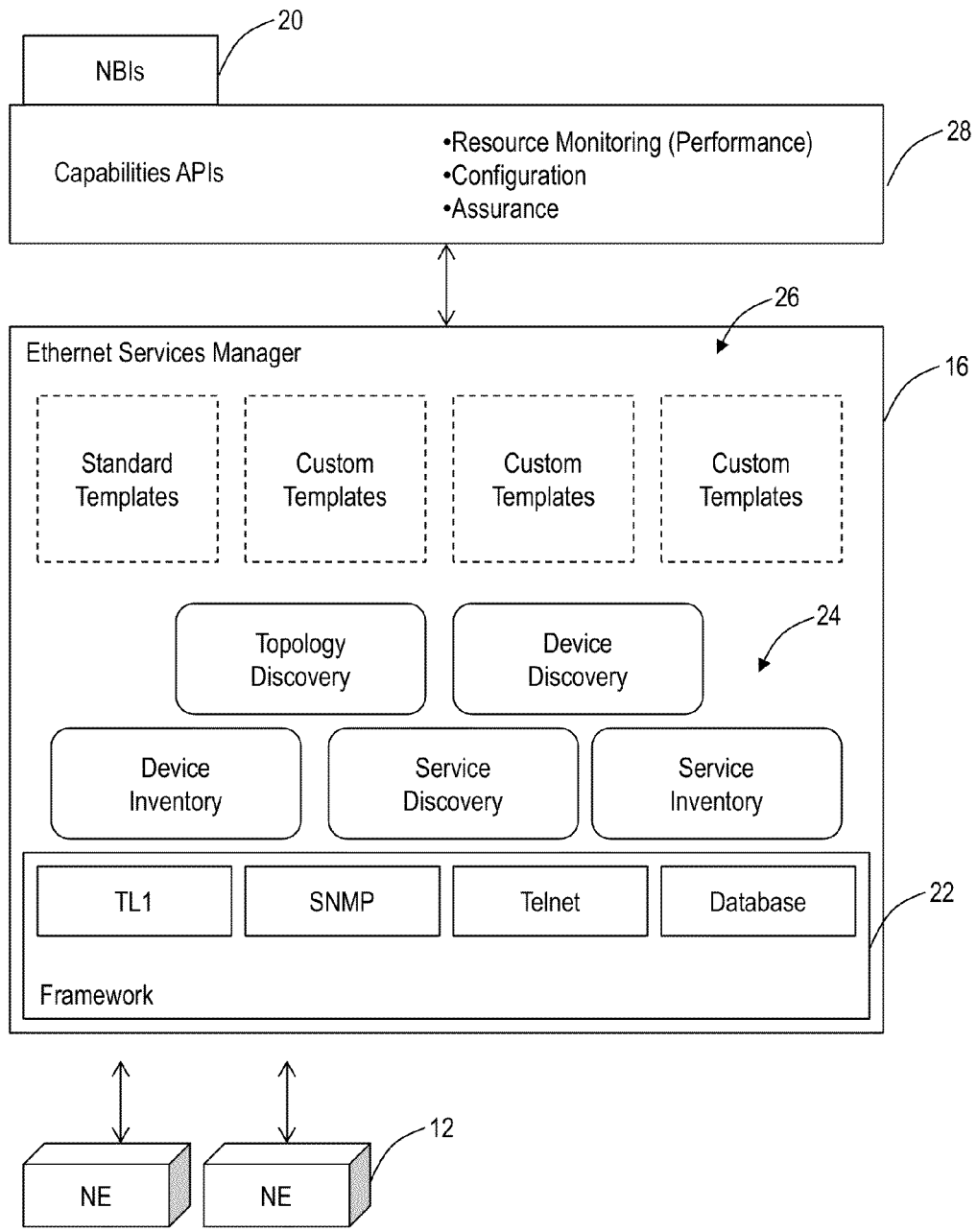
FIG. 2 is a block diagram of functionality of the management system in the network of FIG. 1 relative to the network elements and northbound interfaces (NBIs)

Referring to FIG. 2, in an exemplary embodiment, a block diagram illustrates functionality of the management system 16 relative to the network elements 12 and northbound interfaces (NBIs) 20. The management system 16 may be built upon a framework 22, which provides Fault, Configuration, Accounting, Performance, and Security (FCAPS) network management functions. Some additional functions 24 include topology, device, and service discovery, as well as device and service inventory. Of note, end users utilize the management system 16 to provide discovery, inventory, and fault management functions. In addition to the framework 22 and the functions 24, some end users may use standard or customized templates 26 to perform single-ended device and service provisioning. End users may also utilize custom-built templates 26 and scripts to perform customer-specific provisioning tasks. Capability Application Programming Interfaces (APIs) 28 may reside between the northbound interfaces 20 and the management system 16. These APIs 28 may include, for example, resource/performance monitoring, configuration, assurance, etc. With separate organizations developing provisioning-related templates 26, some effort is being duplicated. In addition, the service and network management functionality of the templates 26 would be advantageous to any end user. Thus, various functionality associated with the functions 24 and the templates 26 may be combined in a Generic Multi-Layer Provisioning (GMLP) layer.

Figure 3:
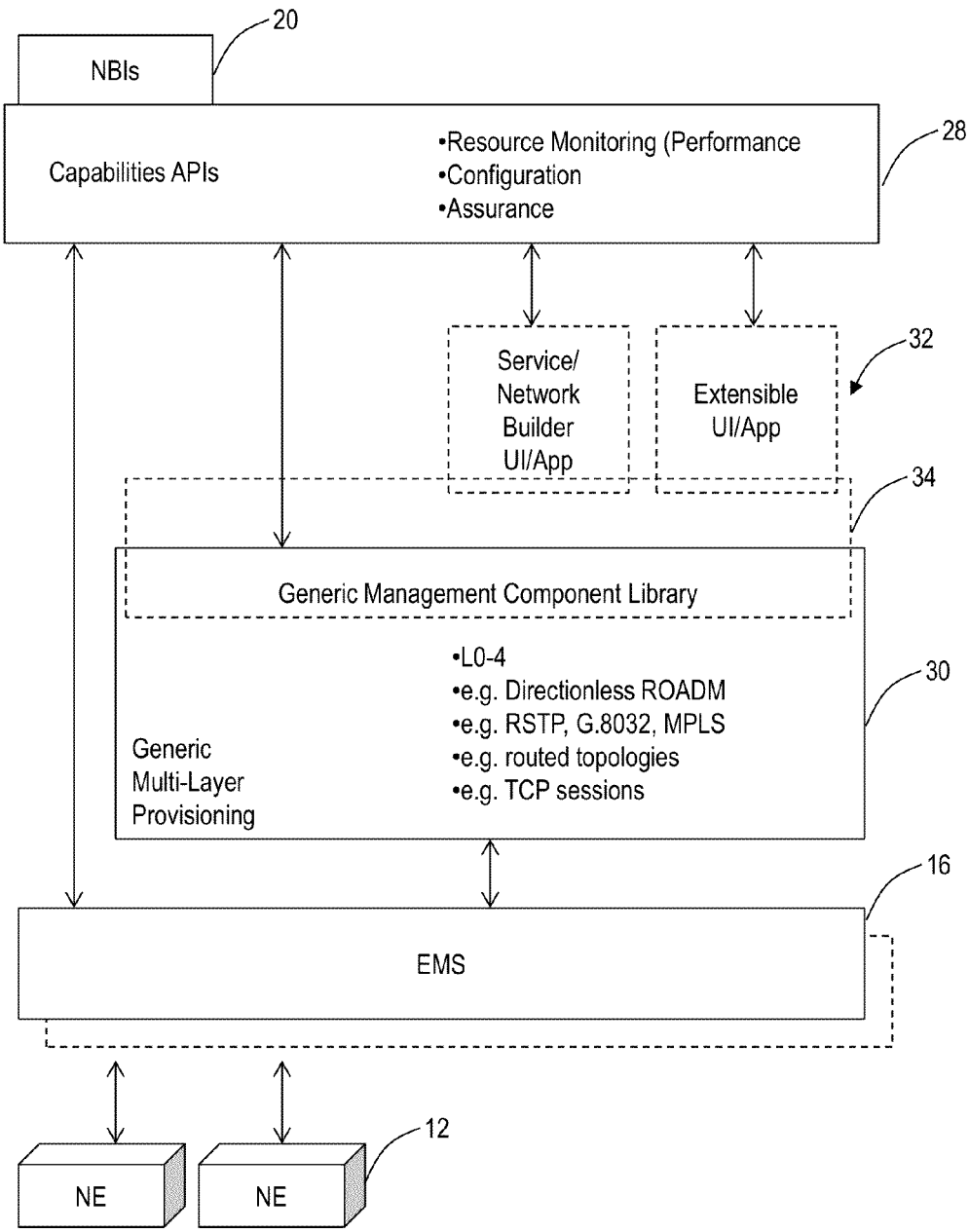
FIG. 3 is a block diagram of functionality of a Generic Multi-Layer Provisioning (GMLP) layer relative to the management system, the network elements, and the northbound interfaces of the network of FIG. 1.

Referring to FIG. 3, in an exemplary embodiment, a block diagram illustrates functionality of a Generic Multi-Layer Provisioning (GMLP) layer 30 relative to the management system 16, the network elements 12, and the northbound interfaces 20. The GMLP layer 30 enables a completely abstract service modeling function. This abstraction enables layer 0-4 topologies and services to be modeled and provisioned. Applications and user interfaces (UIs) 32 may be built above the GMLP layer 30 to provide customer specific provisioning tools. To avoid duplicative efforts, the GMLP layer 30 includes a Generic Management Component Library (GMCL) 34 of commonly used APIs and functions. This way, systems engineers and professional services engineers can focus efforts on truly unique customer requirements, reducing cost and time-to-market. While the GMLP layer 30 is positioned between the Capability APIs 28 and one or more management systems 16, the GMLP layer 30 does not prohibit direct interfacing. The northbound interfaces 20 can still interface with the management systems 16 to access network element 12 functions. For instance, trap and alarm monitoring may be performed directly between the management system 16 and the Capability API 28 such as Resource Monitoring.

Figure 4:
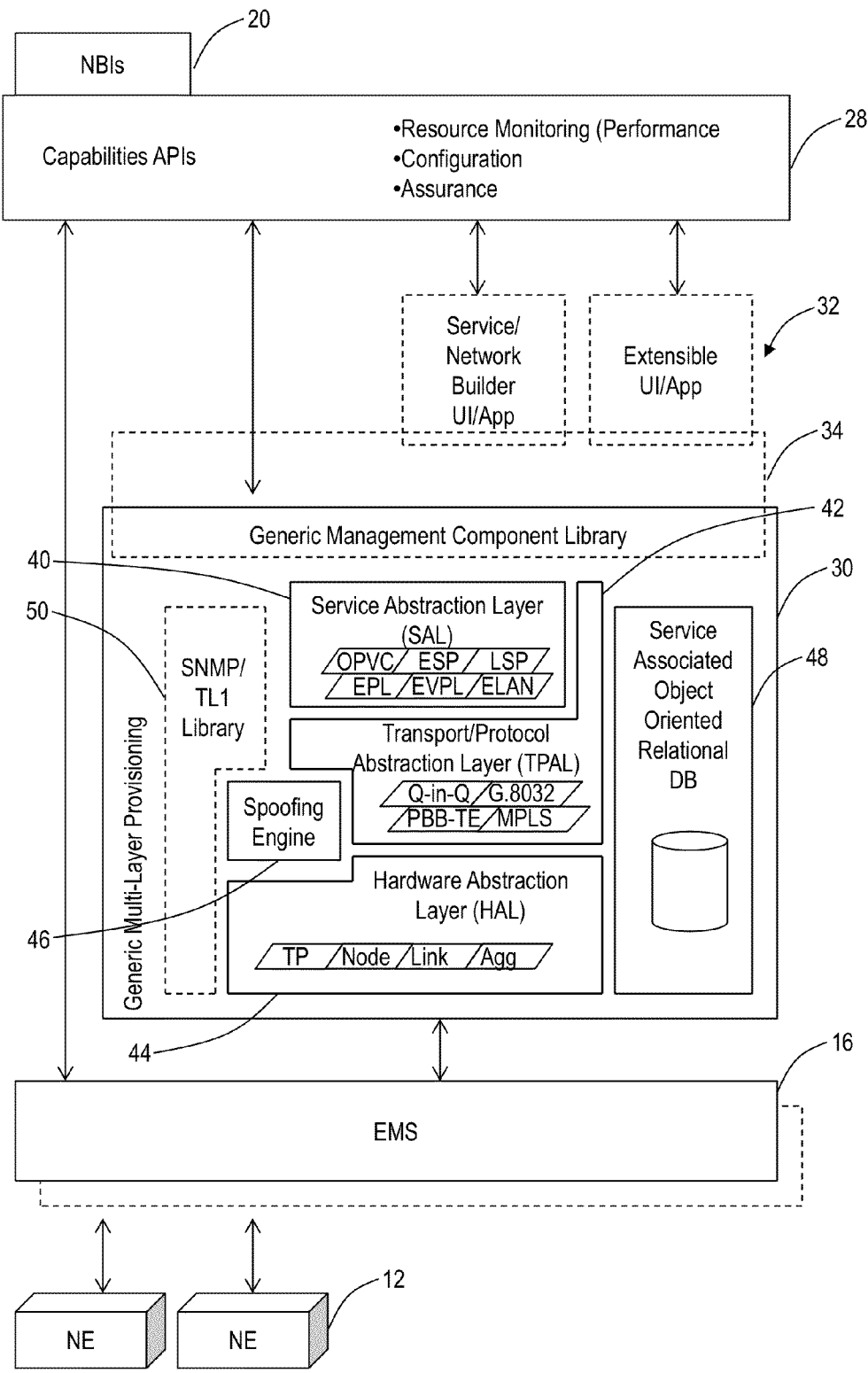
FIG. 4 is a block diagram of components within the GMLP layer.

Referring to FIG. 4, in an exemplary embodiment, a block diagram illustrates components within the GMLP layer 30. In addition to the GMCL 34, the GMLP layer 30 includes several components such as a Service Abstraction Layer (SAL) 40, a Transport/Protocol Abstraction Layer (TPAL) 42, a Hardware Abstraction Layer (HAL) 44, a Spoofing Engine 46, a Service Associated Object Oriented Relational Database (DB) 48, a Simple Network Management Protocol (SNMP)/Transaction Language 1 (TL1) Library 50, and the like. Network Operators use the SAL 40 to create end-to-end services, such as Ethernet Private Line (EPL). It is a completely abstract service abstraction layer. Attributes such as bandwidth parameters are associated with the service in the form of a device-independent traffic profile. This information is stored in the service associated object-oriented relational database 48. Since the SAL 40 uses an abstract model of termination points, transport services may also be described and created. While described herein relative to Ethernet, the SAL 40, and hence the GMLP layer 30, is not restricted to Ethernet services or topologies. As an example, the SAL 40 may be used to provision a ring using SONET/SDH/OTN.

With the GMLP layer 30, services are created independent of underlying transport connectivity, protocols, and encapsulations. The express purpose of the TPAL 42 is to alleviate the operator from knowing and dealing with protocols deployed in the network 10. For instance, a service could be delineated as a single Customer Tagged service, yet traverse both Provider Backbone Bridging-Traffic Engineering (PBB-TE) Ethernet Switches Paths (ESPs) and Multiprotocol Label Switching (MPLS) Label Switched Paths (LSPs) seamlessly. The TPAL 42 associates the appropriate hop-by-hop frame transforms with the service stored in the database 48 to enable the transport of the service end-to-end across the network 10. The HAL 44 performs two essential functions. First, it utilizes the SNMP/TL1 Library 50 (and a corresponding interface to TL1 and SNMP agents on the management system 16) to gather more complete network element 12 information. Second, the HAL 44 forms an abstract model of each network element 12 including termination points, system nodes, links 14, and aggregations. When services are ready to be deployed, the HAL 44 maps abstract services across the appropriate management system 16 API instructing the management system 16 to perform element 12 configuration. This may be performed via TL1 commands, Command Line Interface (CLI) commands via CLI, or SNMP sets.

The database 48 provides a relational repository for services, tunnels, and device specific attributes. The database 48 inherently provides an audit trail and back-out capabilities. In addition, the database 48 is portable to other servers for redundancy or scalability. An important capability of the GMLP layer 30 is the ability to simulate network elements 12 and provisioning functions. The GMLP layer 30 supports the ability to import a customer's deployed network information (device information and link database). Provisioning events may then be simulated using the imported network information. The Service/Network Builder User Interface/Application 32 can be fully proven without any need for network access or disruption. This is accomplished via the Spoofing Engine 46. Anytime the GMLP layer 30 attempts to access a simulated or spoofed device, the Spoofing Engine 46 intercepts the request and provides the appropriate response. As described herein, spoofing, such as a spoofed device, for example, refers to a simulated device or network element that is not physically present in a network, but emulated by the GMLP layer 30 such as through the Spoofing Engine 46. The optional SNMP/TL1 Library 50 provides a facility to perform a more complete device discovery. This can fill in vital information not previously discovered by the management system 16.

In addition to the foregoing, other unique functionality may be included through the GMLP layer 30 including a Supersetting Normalizing Function and a Resource Abstract Object Model in the SNMP/TL1 Library 50, the database 48 being a Service Associated Object Oriented Relational Database, a Simulator/Planning Tool for Pre-deployment Provisioning through the Spoofing Engine 46, and a Dynamic Graphic User Interface (GUI) with Multi-Path Selection through the Service/Network Builder User Interface/Application 32.

Through the use of abstraction, the GMLP layer 30 is able to model any networking component, such as connectivity, protection, service, and resource components. For example, exemplary connectivity group components may include:

Physical links
Connectivity Fault Management (CFM) associations
PBB-TE tunnels (Ethernet Switches Paths)
PBB-TE services (Instance-Service Identifier associations)
MPLS virtual circuit associations
MPLS label switched paths -continued Virtual switches (Ethernet forwarding domains)
Optical channel Data Unit (ODU) channels For example, exemplary Protection type components may include:

Point-to-point based protection
Link aggregations
Rings-based protection types such as Rapid Spanning Tree Protocol (RSTP), Multiple
Spanning Tree Protocol (MSTP) instance, G.8032 logical/virtual, etc.
Tunnel groups such as PBB-TE groups, MPLS LSP groups, etc.
Mesh protection types such as through a control plane For example, exemplary Service type components may include:

Ethernet Private Line (EPL)
Ethernet Virtual Private Line (EVPL)
Ethernet LAN (ELAN)
Ethernet Tree (E-Tree)

Figure 5A:
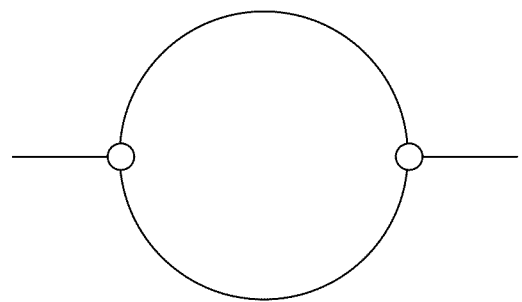
FIGS. 5A-5G are diagrams of the GMLP layer using graph theory as the basic building blocks of connectivity objects.
Figure 5B:
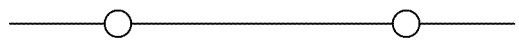
Figure 5C:
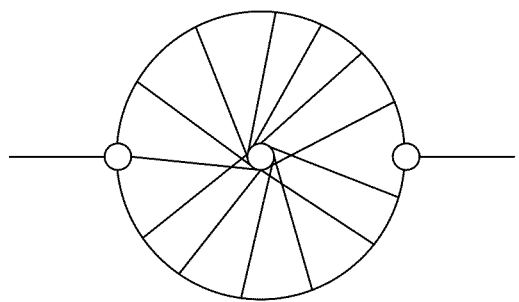
Figure 5D:
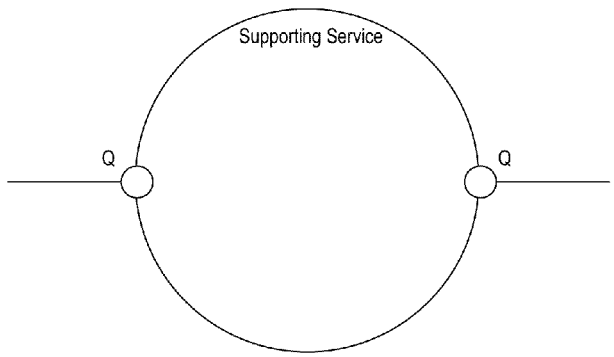

Each service may have service level assurance (SLA) attributes such as connectivity check, latency and jitter measurements, etc. Exemplary Resource tracking components may include:

Committed Information Rate (CIR)
Excess Information Rate (EIR)
Booked bandwidth
Maximum bandwidth Referring to FIGS. 5A-5G, in an exemplary embodiment, the GMLP layer 30 uses graph theory as the basic building blocks of connectivity objects. An object is either Order 2 or Order !2. FIGS. 5A and 5B illustrate a graphical representation of an order 2 connectivity object with FIG. 5A including redundancy and FIG. 5B without redundancy. Order 2 is a connectivity group that connects an ingress and an egress point. It inherently has redundancy between the two points (FIG. 5A). Resolving what the supporting service (the actual connectivity between ingress point and egress point) does (how it is built and provisioned) is another iteration of the same function. The function is called iteratively (or recursively) until the service is fully resolved. This results in a very small, highly maintainable topology engine. FIG. 5C illustrates a graphical representation of an order !2 connectivity object (e.g., think bicycle wheel). Order !2 is a connectivity group that connects a set of connectivity points. It inherently has redundancy between the set of points. Order !2 is an atomic function (and has no supporting service). For instance, deploying G.8032 over spanning tree is practically impossible. Order !2 copes with both head drop and tail drop architectures. Whether you port drop transmit or port drop receive, the architecture resolves the full set of connectivity (including redundancy).

In an exemplary embodiment, consider an Ethernet service delineated via IEEE 802.1Q (Q) VLAN tags. A point-to-point service may be represented via the order 2 diagram in FIG. 5D. In this example, connectivity between the end points is defined or described until the topology engine is called again.

Figure 5E:
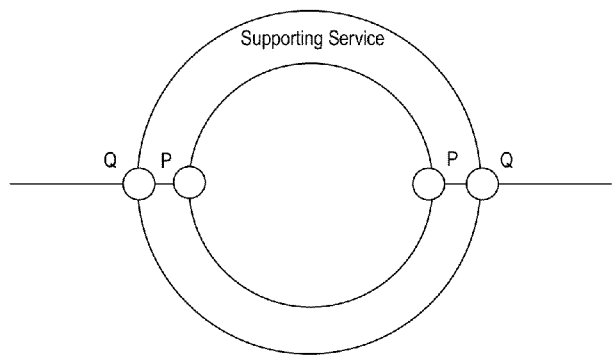
Figure 5F:
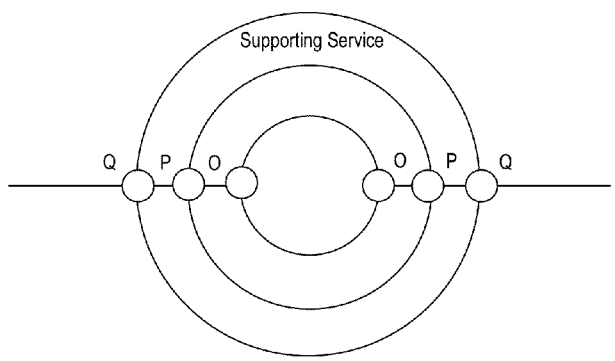
Figure 5G:
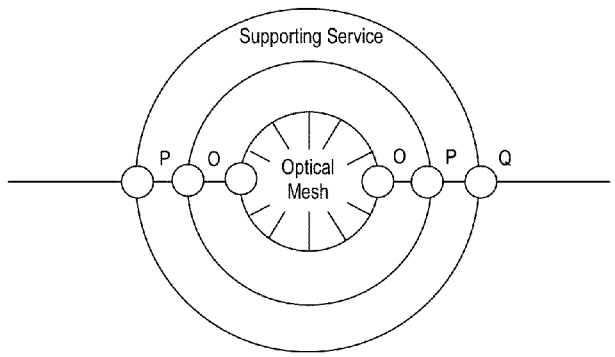

The diagram in FIG. 5E shows the results of calling the topology engine. Is this example, the IEEE 802.1Q service is delivered via an IEEE 802.1Qay PBB-TE (P) pair of tunnels. Again, connectivity between the two PBB-TE endpoints is not defined or described, until the topology engine is called. Once called, it is determine that the PBB-TE tunnels are carried via an ODU (O) channel as shown in FIG. 5F. Once more, connectivity between the two ODU endpoints is not defined or described, until the topology engine is called. Once called, it is determine that the ODU channel is delivered across an order !2 optical mesh topology, such as those configured and maintained by a control plane as shown in FIG. 5G.

Advantageously, the GMLP service management layers (SAL, TPAL, HAL) 40, 42, 44 may operate on either actual/deployed topologies/network elements 12 or artificial/pre-deployed topologies/network elements 12. This is accomplished by either deriving the topology/device inventory from the management system 16 or importing artificial network elements 12. Artificial network elements 12 can be imported en masse or added manually. Other aspects of the GMLP layer 30 include the spoofing engine 46 that provides the necessary feedback for the service management layers, and a per-device flag that indicates if the network elements 12 are artificial and disables polling of attributes such as traffic statistics. Once a device is populated in the database 48 (either discovered via underlying element management system or spoofed via artificial network element importing), various GMLP layers 30 can be populated including the SAL 40, the TPAL 42, and the service associated object oriented relational database 48 with entire topology, tunnels, services.

Network operators can now run moves, adds, changes, deletes (MACD), and can rebuild network configuration using the database 48. Exemplary actions can include import of Media Access Control (MAC) addresses and software versions for large numbers of devices, and planning to add a node to build new nodes with appropriate hardware modules to allow device configurations to be built offline. The GMLP layer 30 provides an ability to populate a topology and device inventory with devices not yet actually deployed. There are two primary benefits, operators can: plan network and service expansion, and perform pre-deployment provisioning. This may be referred to as ghost provisioning, which can reduce service turn up time once the network element(s) 12 are physically deployed. Planning tools are used to create or import new devices. The GMLP layer 30 allows the ability to import a customer's deployed network and link database from existing configuration files as opposed to manual entry. An exemplary embodiment of the GMLP layer 30 then sends queries to a given device. The spoofing engine 46, in an exemplary embodiment, provides responses as if the device actually exists in the network.

A significant benefit is network operators can save time/money by testing and proving provisioning tools against their actual deployed network with very limited development/setup cost. Operators or professional services personnel (developers and/or testers) can be completely isolated from actual network and still develop/prove real customer configurations. Neither the customer nor equipment manufacturers would incur sophisticated lab testing expenses and time using partial network topology in a lab. In an exemplary embodiment, the GMLP layer 30 allows provisioning tools for Tunnels and Ethernet Virtual Circuits to be tested against complex network topologies without requiring large amounts of lab hardware. Through the incremental addition of new Java methods for spoofing specific device queries, the GMLP layer 30 has been extended to generate base hardware configurations for networks that would be extremely expensive in capital and very resource intensive to build in a lab.

By leveraging all the existing management system 16 capabilities, the GMLP layer 30 avoids the problems associated with traditional offline Planning systems in that there is no porting/transfer of data models between the management system 16 and Planning system. The applications/tools developed are completely unaware of whether they are running against a real network or against the simulated one. This minimizes development time, maximizes reusability and improves productivity. With minor additional front end development (for example using the inbuilt northbound interfaces 20 and/or the JAVA Client) it would be possible to offer this as a Cloud service.

Figure 6:
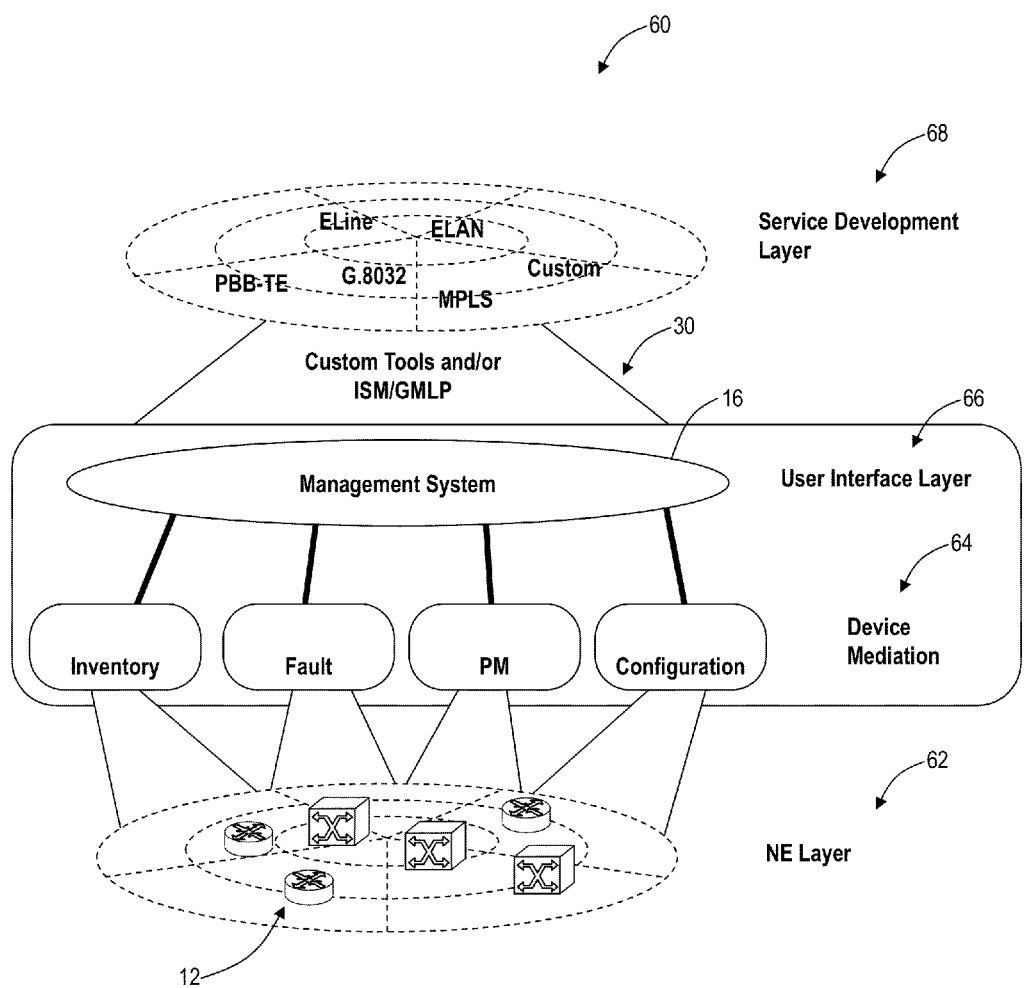
FIG. 6 is a conceptual network diagram of a network for use with the GMLP layer.

Referring to FIG. 6, in an exemplary embodiment, a conceptual network diagram illustrates a network 60 for use with the GMLP layer 30. The network 60 may be viewed with a network element layer 62, a device mediation layer 64, a user interface layer 66, and a service development layer 68. The network element layer 62 includes multiple interconnected network elements 12. The device mediation layer 64 is between the network element layer 62 and the user interface layer 66 and provides a mechanism for interconnectivity between the management system 16 and the network elements 12 for purposes of inventory, fault management, performance management, configuration management, etc. The user interface layer 66 provides a interface to the management system 16 for a network operator and is between the service development layer 68 and the device mediation layer 64. The service development layer 68 conceptually includes various network deployments such as PBB-TE, ELine, ELAN, G.8032, MPLS, etc.

In various exemplary embodiments, the GMLP layer 30 may be viewed as intermediate between the service development layer 68 and the user interface layer 66. The GMLP layer 30 may be referred to as an Integrated Services Management (ISM) layer. In particular, the ISM layer is a generalization of a configuration approach taken by network operators for automating service deployment. The ISM provides a framework for creating, deploying, modifying and terminating connections in the network 60 with embedded support for resource tracking (CIR/EIR, booked and maximum), robust Audit logging for all operations, deployment and Backout option, etc.

Relative to Carrier Ethernet, the MEF Ethernet Virtual Connection (EVC) model is the preference for provisioning a service. The MEF EVC is defined in MEF 10.1 Ethernet Services Attributes Phase 2 (2006), the contents of which are herein incorporated by reference. Of note, a front office user is not interested in anything to do with network devices, the network elements 12, or complexities associated therewith. Thus, from an ISM perspective, the end-to-end architecture should not dictate the provisioning model. The objectives of the ISM/GMLP layer 30 include intelligence in the OSS (Operations Support System) interfaces, platform independence, an algorithmic approach (vs. Heuristics), and the like. The ISM/GMLP layer 30 provides a service model that defines the use of the network, that is the device or network element 12 is subordinate to the service. For example, an Ethernet Private Line (EPL) service has specific characteristics that drive the way the network elements 12 are deployed such as exclusive use of UNI-N (User-To-Network Interface—Network Side) ports and only two UNI ports. The network element 12 may only recognize it has a virtual switch (VS) and an unknown number of UNI ports. In terms of implementation, the implementation is the only network element 12 dependent characteristics of the ISM/GMLP layer 30. That is, once the service characteristics are defined with the ISM/GMLP layer 30, other layers such as the device mediation layer 64 provide physical implementation.

Figure 7:
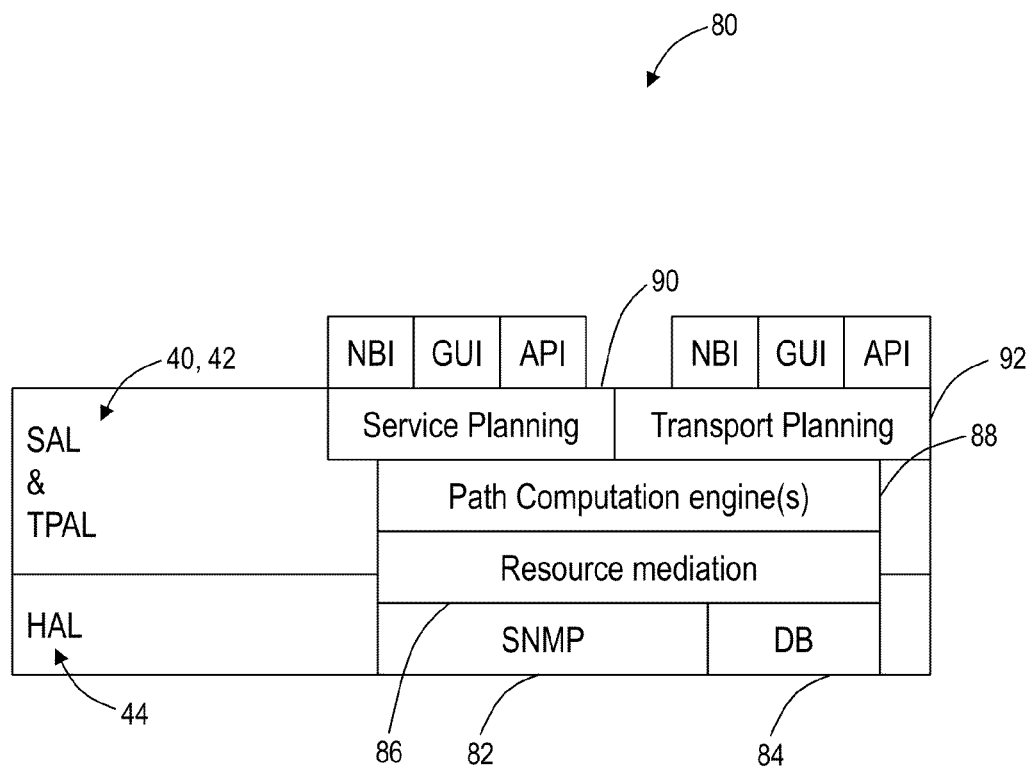
FIG. 7 is a block diagram of a protocol stack for the GMLP layer.

Referring to FIG. 7, in an exemplary embodiment, a block diagram illustrated a protocol stack 80 for the GMLP layer 30. In particular, the protocol stack 80 maps the SAL 40, TPAL 42, and HAL 44 layers from the GMLP layer 30 to associated functionality. The objective of the GMLP layer 30 is to build a number of abstraction layers. The HAL 44 layer enables new hardware to be added quickly via software and to the management system 16. The TPAL 42 layer acts as a normalization layer to hide platform implementation decisions/constraints. The HAL 44 layer may include an SNMP 82 and a database 84 functionality. A resource mediation layer 86 may reside between the HAL 44 and the SAL/TPAL 42, 44. The SAL/TPAL 42, 44 may include path computation engine(s) 88, service planning 90, and transport planning 92. Additionally, the protocol stack 80 may include northbound interfaces, graphical user interfaces, and application programming interfaces thereon.

Figure 8:
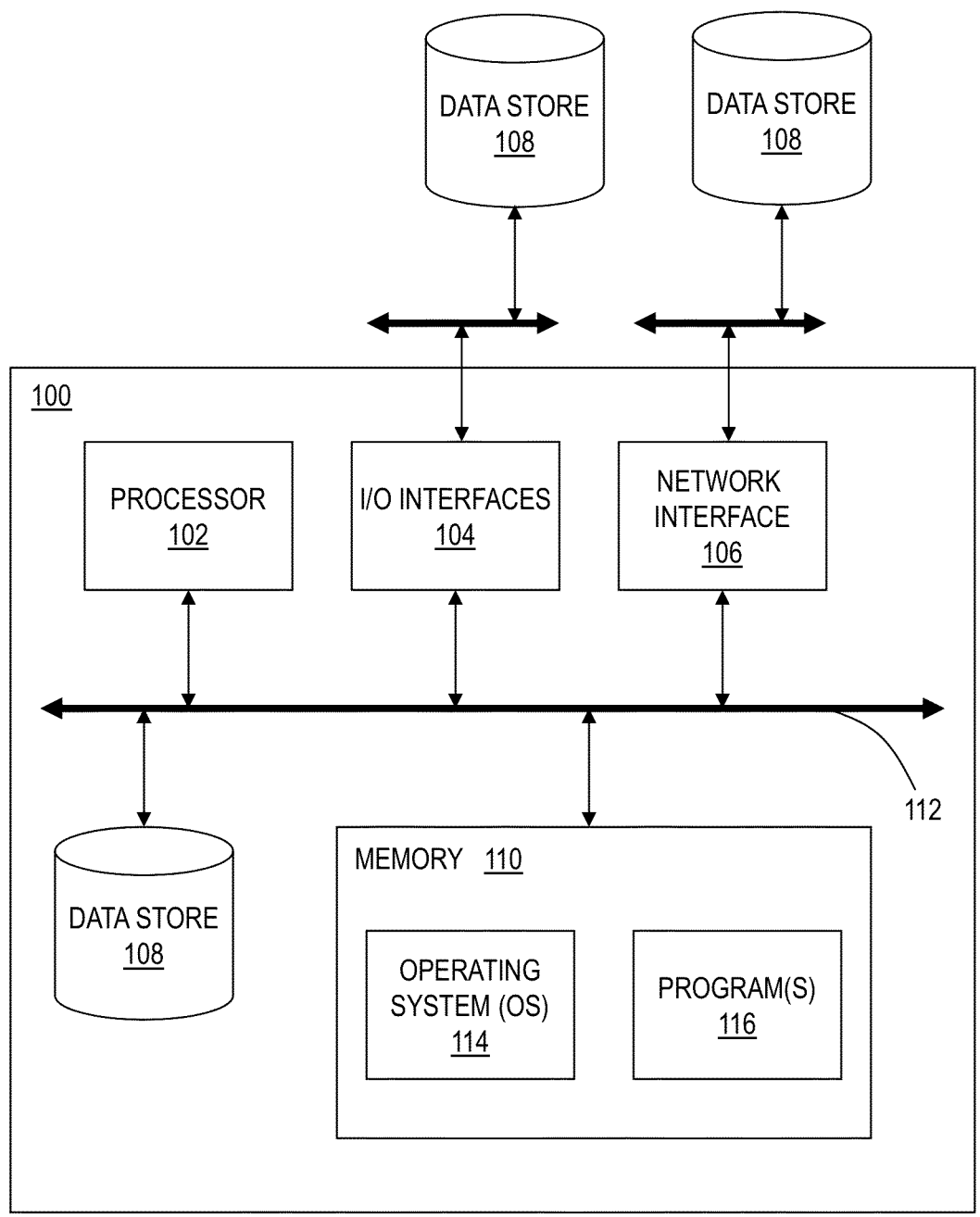
FIG. 8 is a block diagram of a server which may be used for the management system and/or as a stand-alone device to implement a planning/provisioning system with the GMLP layer.

Referring to FIG. 8, in an exemplary embodiment, a block diagram illustrates a server 100 which may be used in the network 10 for the management system 16 and/or as a stand-alone device to implement a planning/provisioning system with the GMLP layer 30. The server 100 may be a digital computer that, in terms of hardware architecture, generally includes a processor 102, input/output (I/O) interfaces 104, a network interface 106, a data store 108, and memory 110. It should be appreciated by those of ordinary skill in the art that FIG. 8 depicts the server 100 in an oversimplified manner, and a practical embodiment may include additional components and suitably configured processing logic to support known or conventional operating features that are not described in detail herein. The components (102, 104, 106, 108, and 110) are communicatively coupled via a local interface 112. The local interface 112 may be, for example but not limited to, one or more buses or other wired or wireless connections, as is known in the art. The local interface 112 may have additional elements, which are omitted for simplicity, such as controllers, buffers (caches), drivers, repeaters, and receivers, among many others, to enable communications. Further, the local interface 112 may include address, control, and/or data connections to enable appropriate communications among the aforementioned components.

The processor 102 is a hardware device for executing software instructions. The processor 102 may be any custom made or commercially available processor, a central processing unit (CPU), an auxiliary processor among several processors associated with the server 100, a semiconductor-based microprocessor (in the form of a microchip or chip set), or generally any device for executing software instructions. When the server 100 is in operation, the processor 102 is configured to execute software stored within the memory 110, to communicate data to and from the memory 110, and to generally control operations of the server 100 pursuant to the software instructions. The I/O interfaces 104 may be used to receive user input from and/or for providing system output to one or more devices or components. User input may be provided via, for example, a keyboard, touch pad, and/or a mouse. System output may be provided via a display device and a printer (not shown). I/O interfaces 104 can include, for example, a serial port, a parallel port, a small computer system interface (SCSI), a serial ATA (SATA), a fibre channel, Infiniband, iSCSI, a PCI Express interface (PCI-x), an infra-red (IR) interface, a radio frequency (RF) interface, and/or a universal serial bus (USB) interface.

The network interface 106 may be used to enable the server 100 to communicate on a network. The network interface 106 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 106 may include address, control, and/or data connections to enable appropriate communications on the network. The network interface 106 can utilize Internet Protocol (IP) or other higher level application protocols (e.g., middleware communication interfaces such as WebLogic). A data store 108 may be used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media. In one example, the data store 108 may be located internal to the server 100 such as, for example, an internal hard drive connected to the local interface 112 in the server 100. Additionally in another embodiment, the data store 108 may be located external to the server 100 such as, for example, an external hard drive connected to the I/O interfaces 104 (e.g., SCSI or USB connection). In a further embodiment, the data store 108 may be connected to the server 100 through a network, such as, for example, a network attached file server.

The memory 110 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 110 may incorporate electronic, magnetic, optical, and/or other types of storage media. Note that the memory 110 may have a distributed architecture, where various components are situated remotely from one another, but can be accessed by the processor 102. The software in memory 110 may include one or more software programs, each of which includes an ordered listing of executable instructions for implementing logical functions. The software in the memory 110 includes a suitable operating system (O/S) 114 and one or more programs 116. The operating system 114 essentially controls the execution of other computer programs, such as the one or more programs 116, and provides scheduling, input-output control, file and data management, memory management, and communication control and related services. The one or more programs 116 may be configured to implement the various processes, algorithms, methods, techniques, etc. described herein. For example, the server 100 may be used to implement the management system 16 and/or a planning/provisioning system with the GMLP layer 30 with the various programs 116 configured to implement various functions associated therewith.

Figure 9:
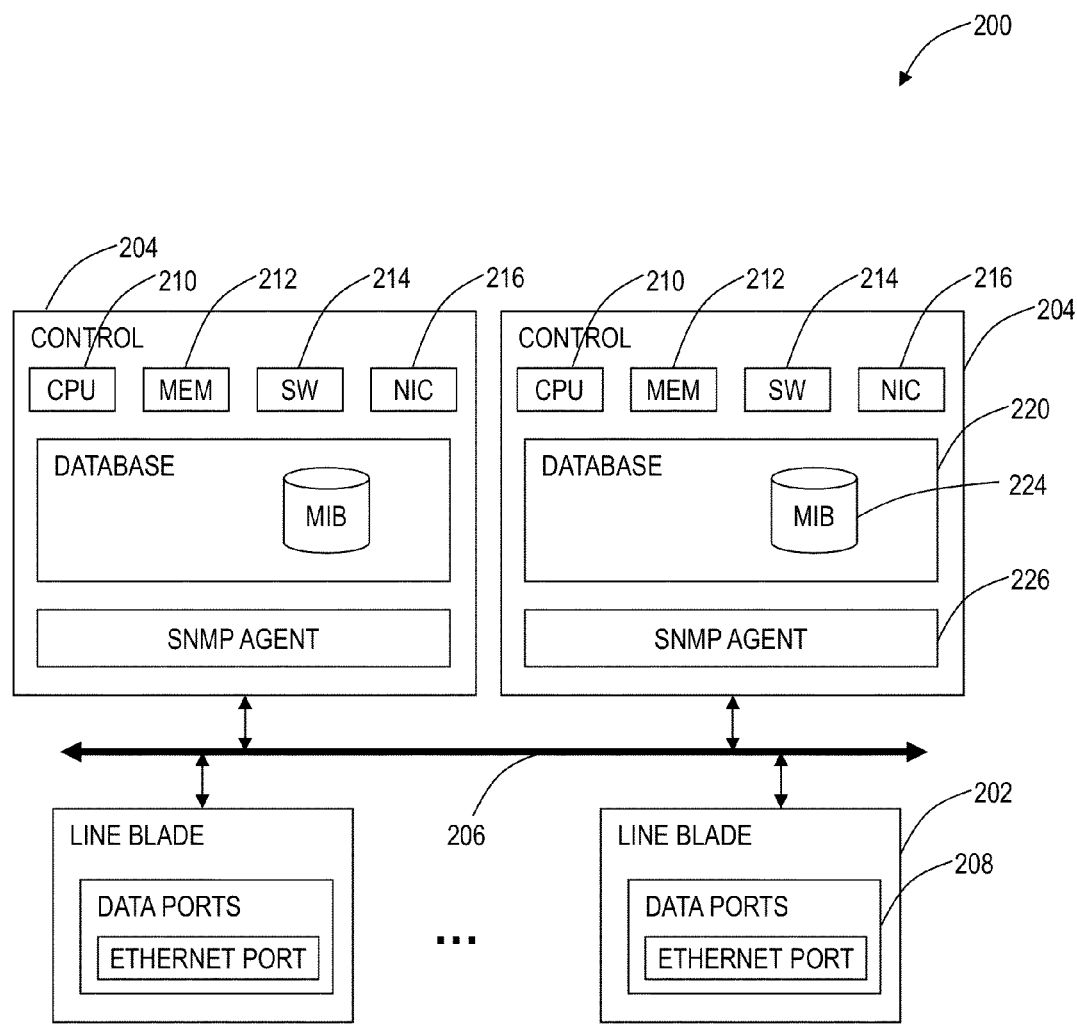
FIG. 9 is a block diagram of an exemplary implementation of a network element for use with the GMLP layer.

Referring to FIG. 9, in an exemplary embodiment, a block diagram illustrates an exemplary implementation of a network element 12 for use with the GMLP layer 30. In this exemplary embodiment, the network element 12 is an Ethernet network switch for illustration purposes, but those of ordinary skill in the art will recognize the Carrier Ethernet systems and methods described herein contemplate other types of network elements and other implementations. In this exemplary embodiment, the network element 12 includes a plurality of blades 202, 204 interconnected via an interface 206. The blades 202, 204 are also known as line cards, line modules, circuit packs, pluggable modules, etc. and refer generally to components mounted within a chassis, shelf, etc. of a data switching device, i.e. the network element 200. Each of the blades 202, 204 may include numerous electronic devices and/or optical devices mounted on a circuit board along with various interconnects including interfaces to the chassis, shelf, etc. Two exemplary blades are illustrated with line blades 202 and control blades 204. The line blades 202 generally include data ports 208 such as a plurality of Ethernet ports. For example, the line blade 202 may include a plurality of physical ports disposed on an exterior of the blade 202 for receiving ingress/egress connections. Exemplary port types may include, but not limited to, GbE, 10 GbE, 40 GbE, 100 GbE, Ethernet over SONET/SDH (2.5G, 10G, 40G, etc.), Ethernet over Optical Transport Network (OTU2, OTU3, OTU4, etc.), and the like. Additionally, the line blades 202 may include switching components to form a switching fabric via the interface 206 between all of the data ports 208 allowing data traffic to be switched between the data ports 208 on the various line blades 202. The switching fabric is a combination of hardware, software, firmware, etc. that moves data coming into the network element 200 out by the correct port 208 to the next network element. In general, the switching fabric may include switching units, or individual boxes, in a node; integrated circuits contained in the switching units; and programming that allows switching paths to be controlled.

The control blades 204 include a microprocessor 210, memory 212, software 214, and a network interface 216. Specifically, the microprocessor 210, the memory 212, and the software 214 may collectively control, configure, provision, monitor, etc. the network element 200. The network interface 216 may be utilized to communicate with a management system such as the management system 16, the server 100, and the like. Additionally, the control blades 204 may include a database 220 that tracks and maintains provisioning, configuration, operational data and the like. The database 220 may include a management information base (MIB) 222 which may include CFM objects. Of note, the Carrier Ethernet systems and methods described herein relate in exemplary embodiments to modification of the CFM objects. Further, the control blades 204 may include an Simple Network Management Protocol (SNMP) Agent 224 configured to operate SNMPv2, SNMPv3, etc. or some other network management communication protocol. In this exemplary embodiment, the network element 200 includes two control blades 204 which may operate in a redundant or protected configuration such as 1:1, 1+1, etc. In general, the control blades 204 maintain dynamic system information including Layer two forwarding databases, protocol state machines, and the operational status of the ports 208 within the network element 200. Additionally, the control blades 204 may be configured to provide CFM and the Ethernet systems and methods for dynamic configuration thereof.

Figure 10:
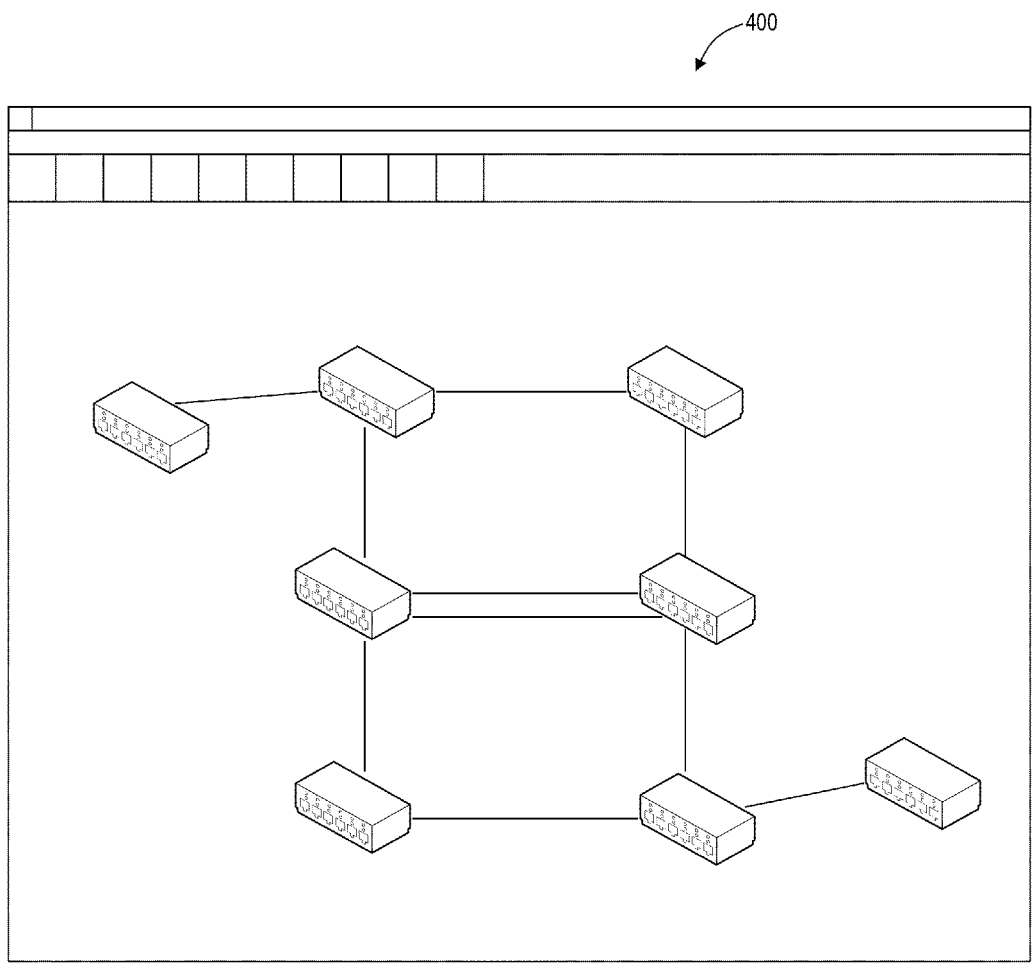
FIG. 10 is a screen diagram of a Graphical User Interface (GUI) associated with a planning/provisioning system using the GMLP layer.

Referring to FIG. 10, in an exemplary embodiment, a screen diagram illustrates a Graphical User Interface (GUI) 400 associated with a planning/provisioning system using the GMLP layer 30. The GMLP layer 30 described herein may be incorporated into a planning/provisioning system, such as operating on the server 100, the management system 16, etc. In particular, the planning/provisioning system using the GMLP layer 30 may include the GUI 400 for user interaction whereby a user may point-and-click on network elements 12 for planning/provisioning thereof. Further, with the GMLP layer 30 and the spoofing engine 46, the planning/provisioning system may operate on non-existent network elements 12, i.e. spoofed network elements 12. Advantageously, the spoofing engine 46 enables operation in an off-line manner. In an exemplary embodiment, the planning/provisioning system may include provisioning tools such as PBB-TE Tunnel builder, EPL service builder, and EVPL (Ethernet Virtual Private Line) builder. The planning/provisioning system may also include other tools to manage services such as tools to move one PBB-TE tunnel group, extract logfiles for auditing and debugging, an Augment extractor to extract readable CLI for deployment and termination, reporting tools for tunnel, service, and inventory reports, and the like.

Figure 11:
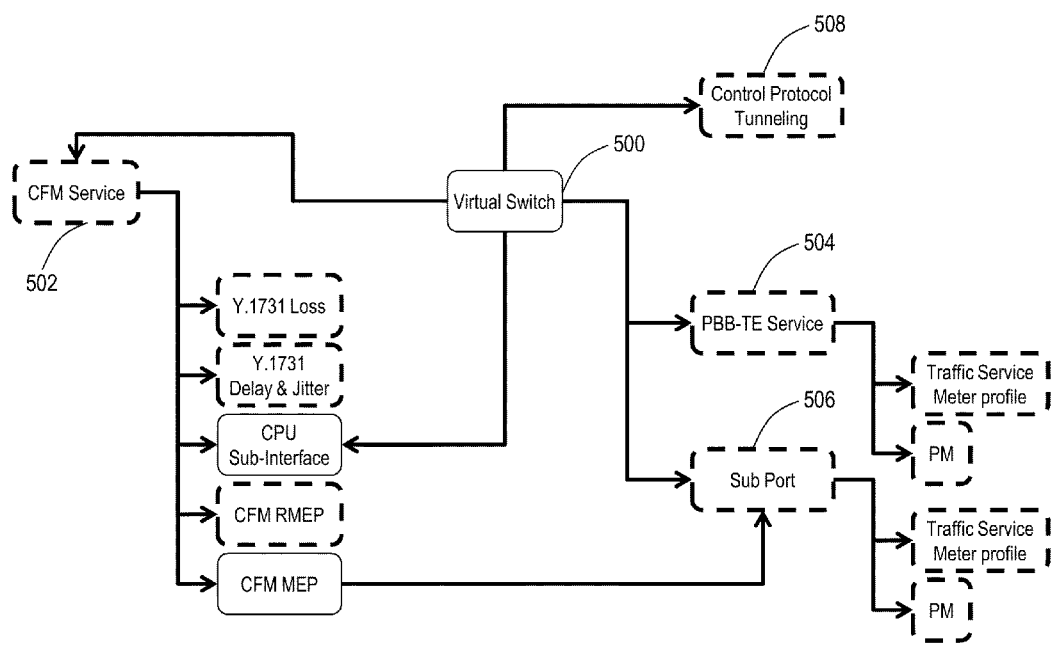
FIG. 11 is a diagram of aspects that may be provisioned in an Ethernet Private Line (EPL) service using the planning/provisioning system on a single network element.
Figure 12:
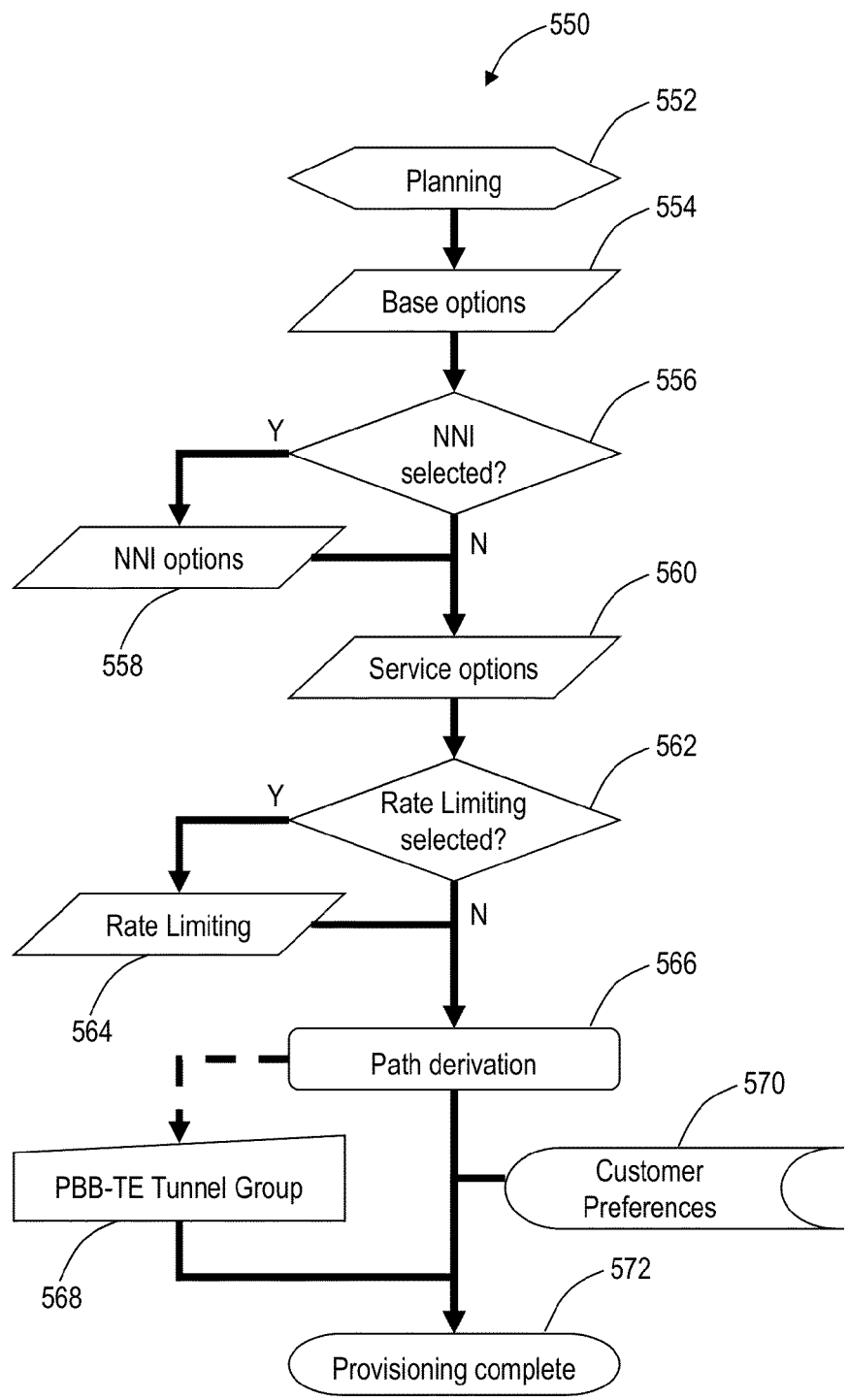
FIGS. 12-15 are a flowchart of an EPL/Ethernet Virtual Private Line (EVPL) provisioning method and associated GUI screens using the planning/provisioning system.

Referring to FIG. 11, in an exemplary embodiment, a diagram illustrate what aspects may be provisioned in an EPL service using the planning/provisioning system on a single network element 12. From a virtual switch 500 associated with the network element 12, the planning/provisioning system may support provisioning of a Connectivity Fault Management (CFM) service 502, a PBB-TE service 504, a sub-port service 506, and a control protocol tunneling service 508. For the CFM service 502, the planning/provisioning system may support provisioning of Y.1731 loss, Y.1731 delay and jitter, CFM Maintenance End Points (MEP), and CFM remote MEPs (RMEP). The virtual switch 500 may also directly connect to a CPU sub-interface for the CFM service 502. The PBB-TE service 504 and the sub-port service 506 may each be configured with a traffic service meter profile and performance management.

Referring to FIGS. 12-15, in an exemplary embodiment, a flowchart illustrates an EPL/EVPL provisioning method 550 and associated GUI screens using the planning/provisioning system. From a planning step (step 552), base options are selected for an EPL/EVPL service (step 554). For example, the EPL/EVPL service may include a network-network interface (NNI) (step 556). If an NNI is selected, NNI options may be determined (step 558). Next, service options are selected (step 560). The EPL/EVPL service may include rate limiting (step 562). If rate limiting is selected, rate limiting options may be determined (step 564). The provisioning method 550 provides path derivation (step 566), and this may be via a PBB-TE tunnel group (step 568) and/or using customer defined preferences (step 570). Finally, the EPL/EVPL service provisioning is complete (step 572).

Figure 13:
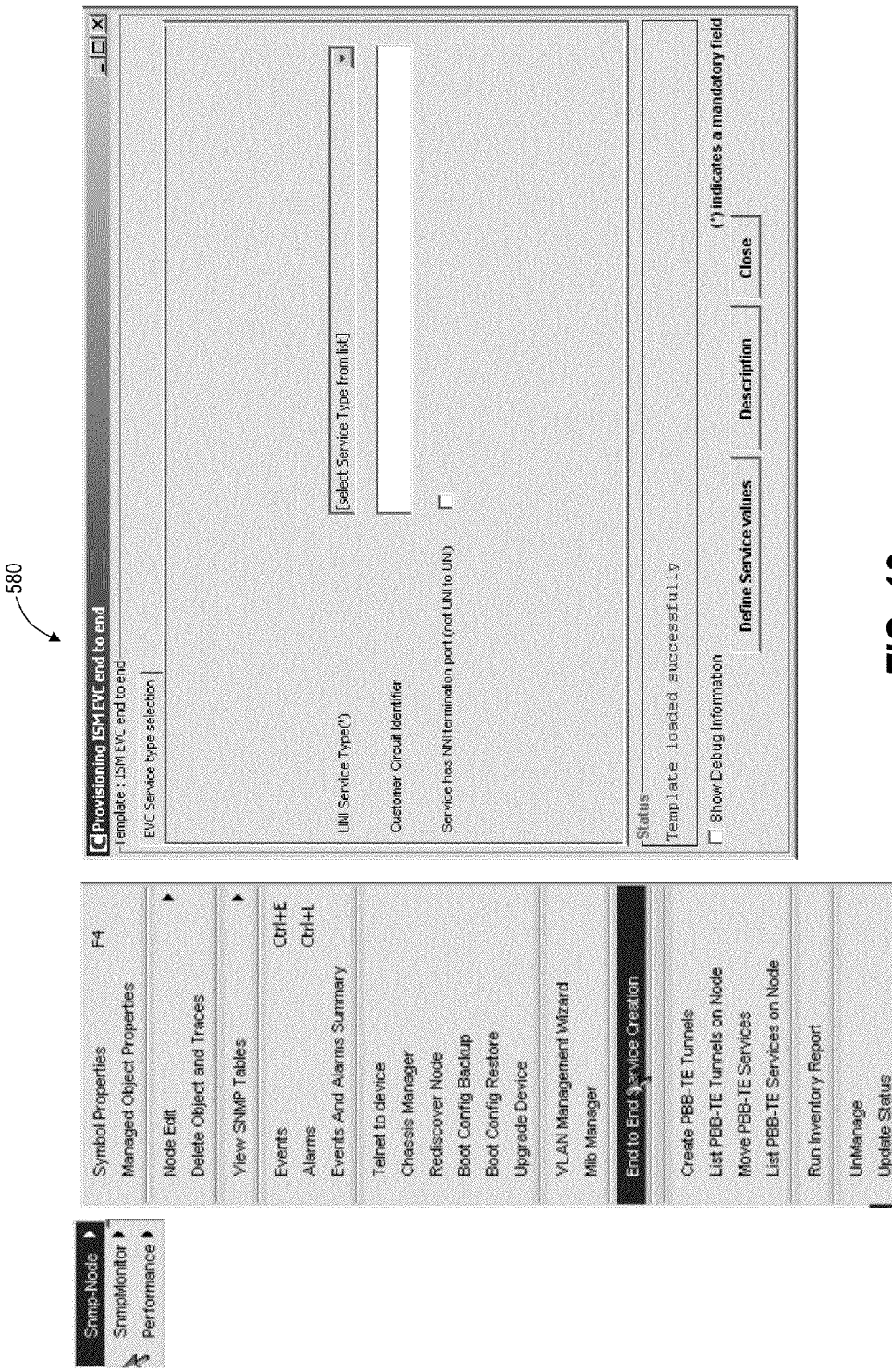
Figure 14:
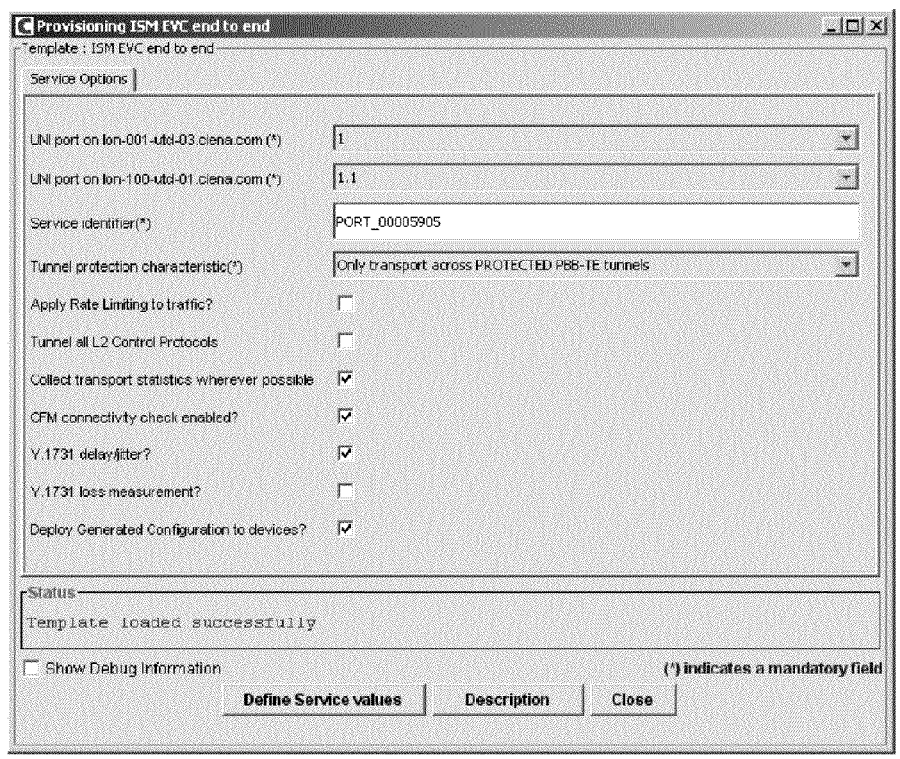
Figure 15:
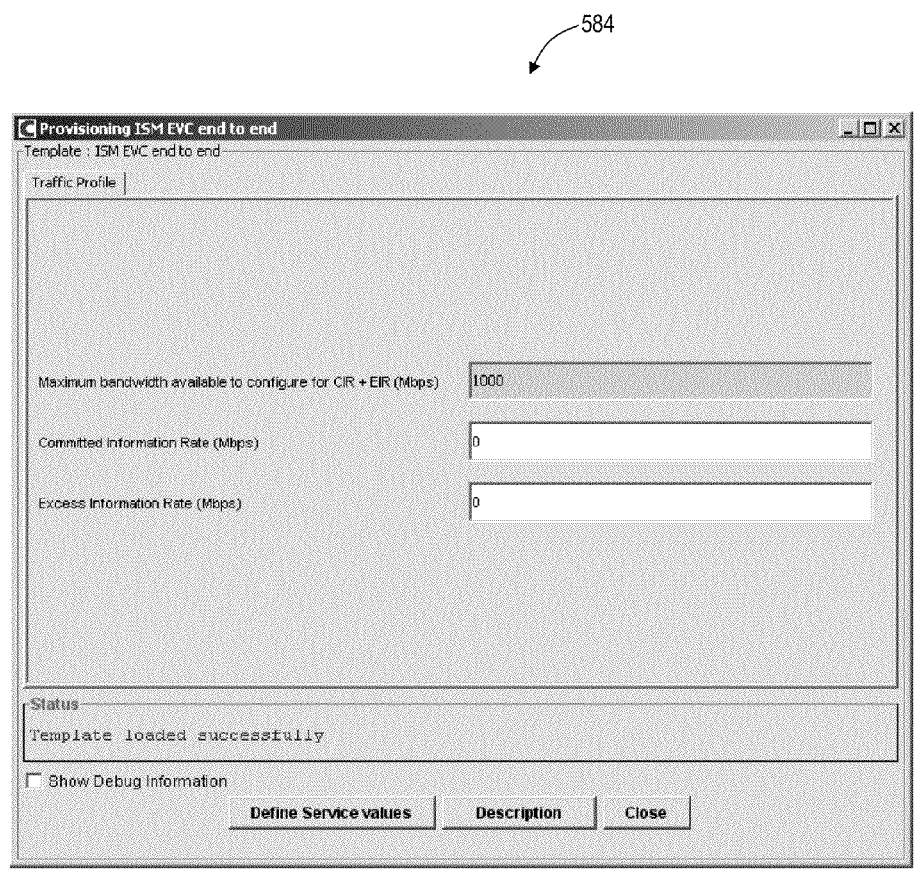
Figure 16:
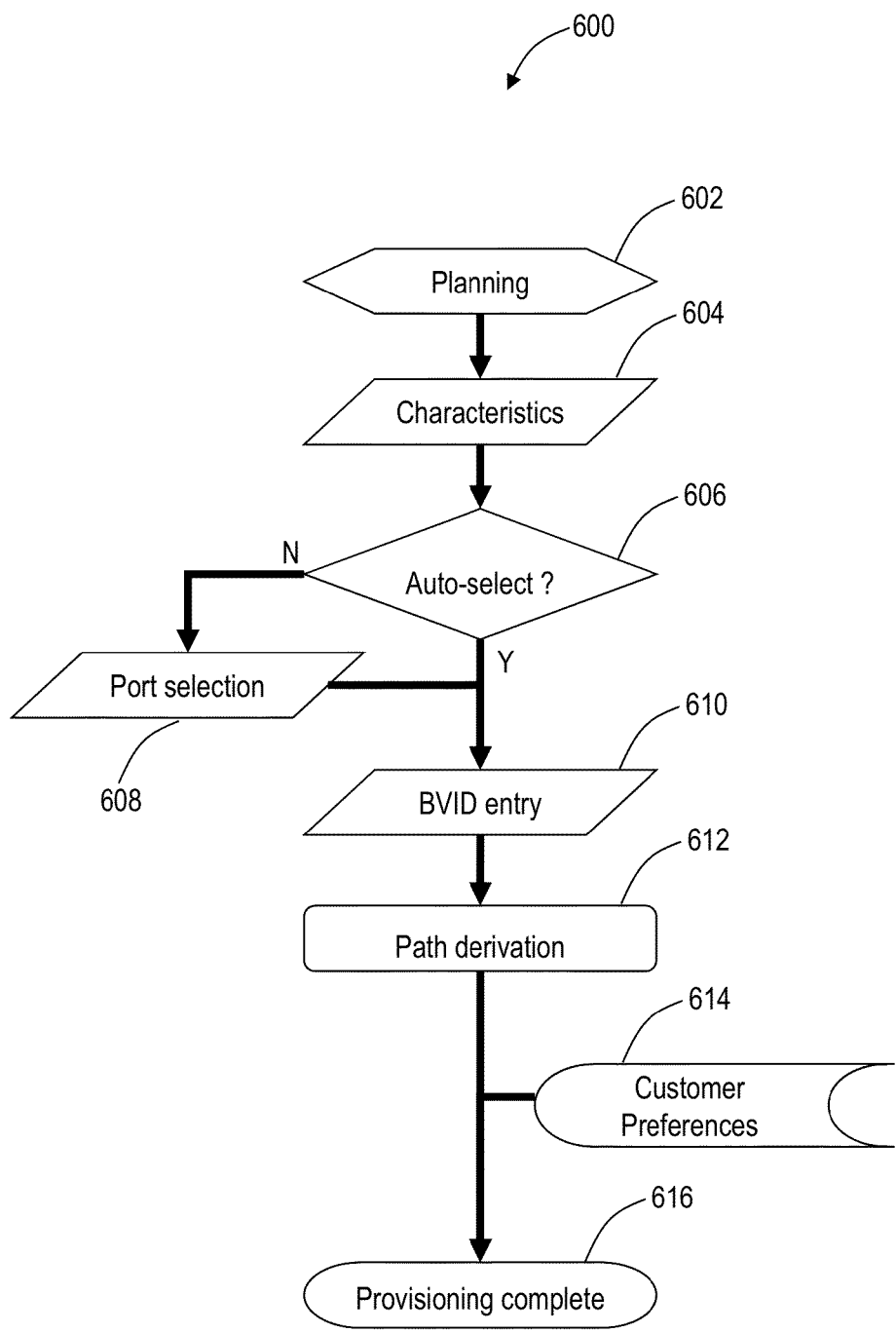
FIGS. 16-19 are a flowchart illustrates a Provider Backbone Bridge Traffic Engineering (PBB-TE) tunnel provisioning method and associated GUI screens using the planning/provisioning system.

FIG. 13 illustrates a GUI 580 from the planning/provisioning system for provisioning an EVC, i.e. an EPL/EVPL service. In particular, the GUI 580 provides an EVC service selection type screen where a user may select a service type, provide a circuit identifier, and select NNI. In an exemplary embodiment, the GUI 580 may be brought up via the GUI 400 and the GUI 580 is selected from a menu, i.e. End to End Service Creation. Note, the planning/provisioning system may have other functions in the menu as listed in FIG. 13. FIG. 14 illustrates a GUI 582 from the planning/provisioning system for defining the service options. These service options may include a service identifier, tunnel protection characteristics, rate limiting, tunnel of Layer 2 control protocols, collection of statistics, CFM connectivity check messages, Y.1731 loss, Y.1731 delay and jitter, and the like. FIG. 15 illustrates a GUI 584 for the planning/provisioning system for rate limiting via a traffic profile. In particular, the GUI 584 enables selection of a committed information rate (CIR) and an excess information rate (EIR).

Referring to FIGS. 16-19, in an exemplary embodiment, a flowchart illustrates a PBB-TE tunnel provisioning method 600 and associated GUI screens using the planning/provisioning system. From a planning step (step 602), characteristics are selected for a PBB-TE tunnel (step 604). For example, the provisioning method 600 may auto-select port (step 606), and if not, the user may select a port (step 608). The user may provide a backbone Virtual Local Area Network (VLAN) identifier (BVID) (step 610). The provisioning method 600 may provide path derivation (step 612) utilizing customer preferences (step 614). Finally, the PBB-TE tunnel provisioning is complete (step 616).

Figure 17:
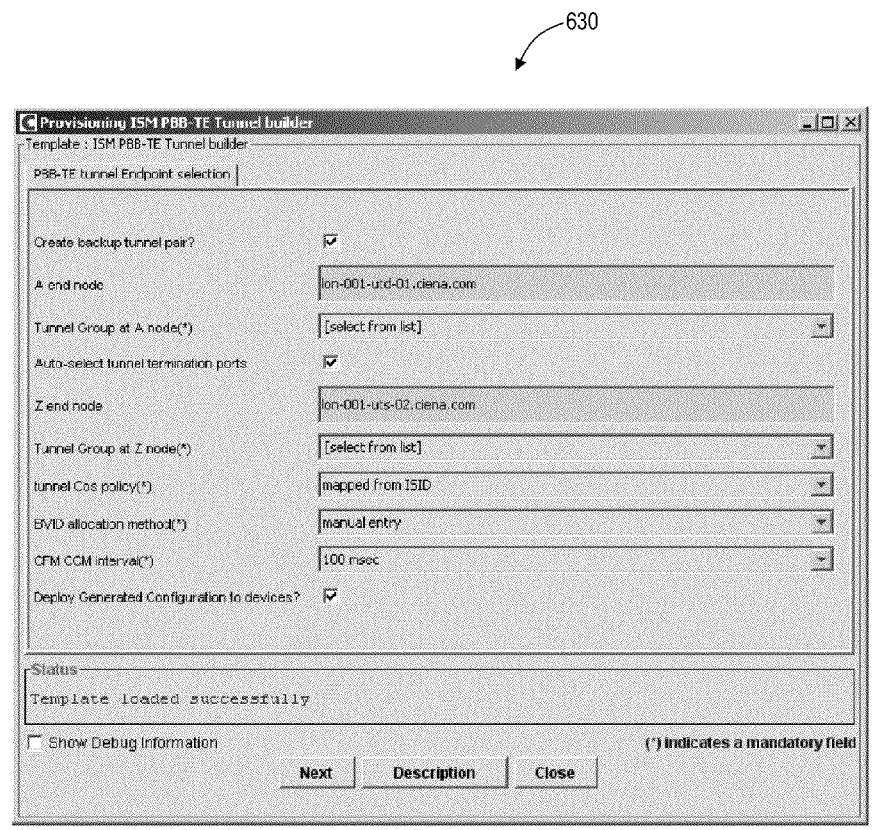
Figure 18:
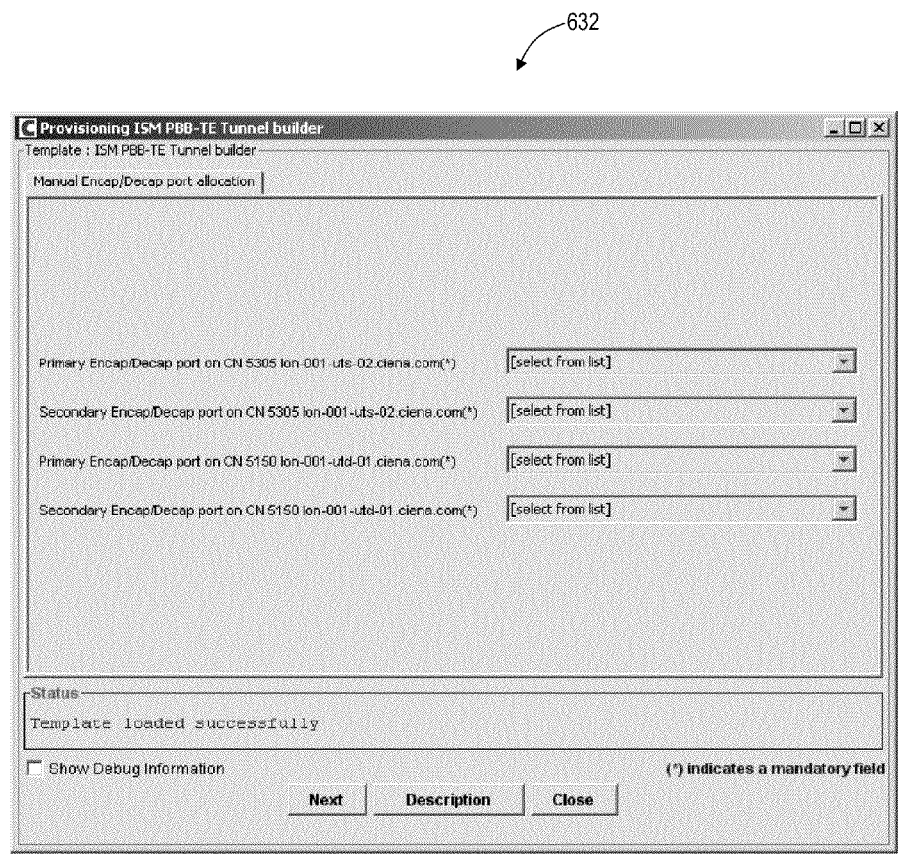
Figure 19:
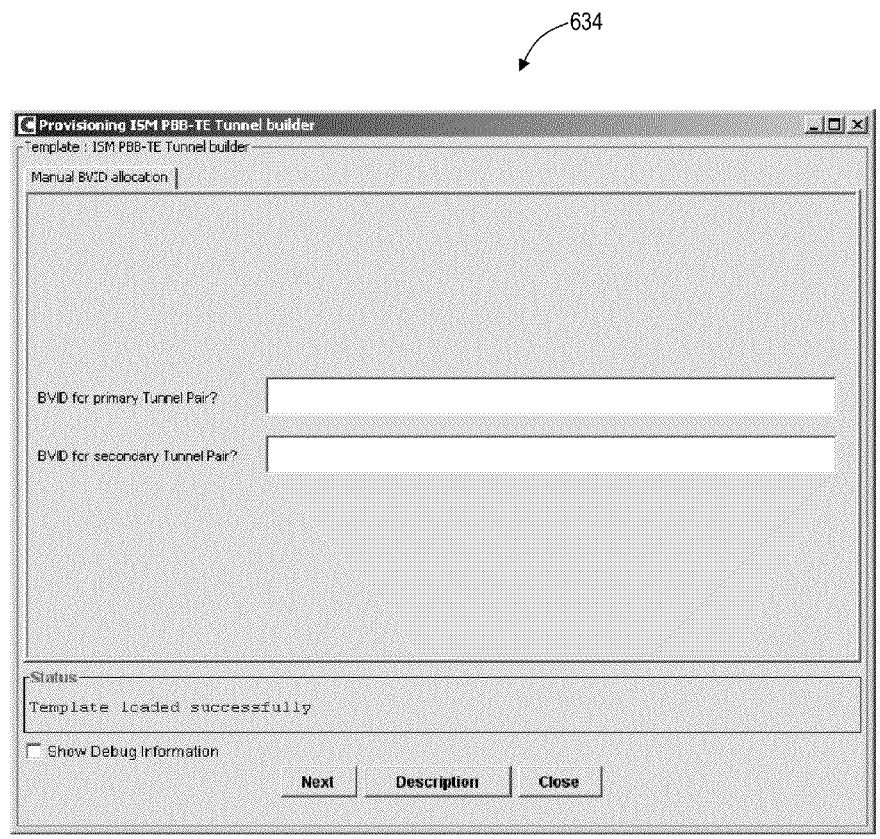

FIG. 17 illustrates a GUI 630 from the planning/provisioning system for provisioning a PBB-TE tunnel. In particular, the GUI 630 provides a screen for PBB-TE tunnel endpoint selection. This may include options to create a backup tunnel pair, designate end nodes (A and Z nodes), designate tunnel groups, tunnel policy, BVID allocation method, continuity check message (CCM) interval, and the like. FIG. 18 illustrates a GUI 632 from the planning/provisioning system for manual encapsulation/decapsulation port allocation. FIG. 19 illustrates a GUI 634 from the planning/provisioning system for manual BVID allocation.

The planning/provisioning system with the GMLP layer 30 may provide various additional GUIs, templates, etc. for other services besides Carrier Ethernet. In various exemplary embodiment, the planning/provisioning system collects parameters from multi-stage GUIs, templates, etc. The GUIs may be context-sensitive, i.e. subsequent screens/menus are based on selected fields from previous screens/menus. The planning/provisioning system may use serialized objects to pass on detailed information across stages. The planning/provisioning system and the GMLP layer 30 may perform object manipulation inside of native Java classes. Files are sourced to minimize risk, and may include a customizable preferences file with Constants (static values, ports to be used as NNI, . . . ), Parameter ranges (reserved VIDs, BVIDs, provider VIDs, . . . . ), Security values (to hide user login information), Algorithms to define naming rules (Java methods), etc.

Figure 20:
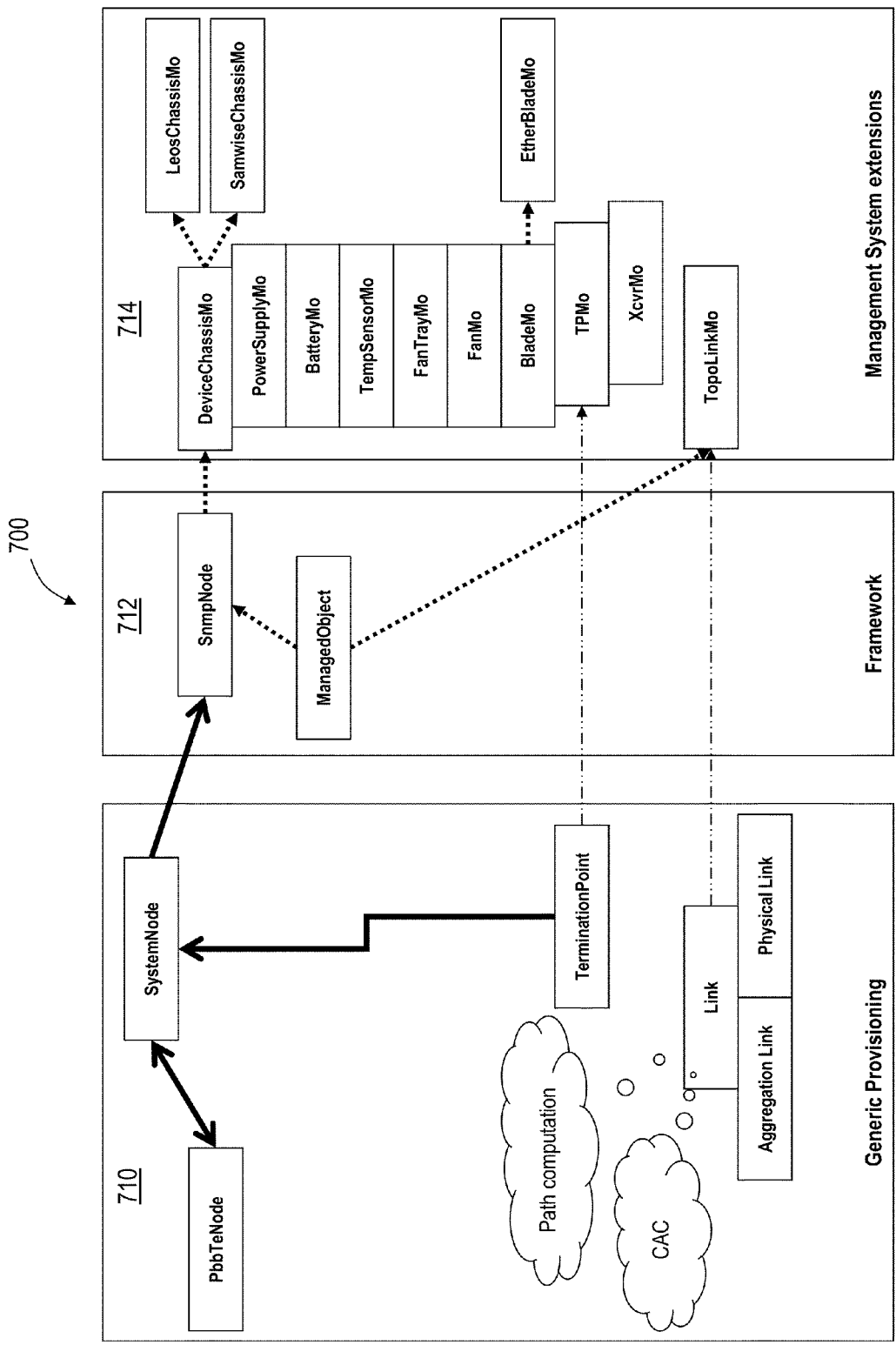
FIGS. 20-22 are, relative to a Carrier Ethernet implementation, object models for the planning/provisioning system with the GMLP layer.
Figure 21:
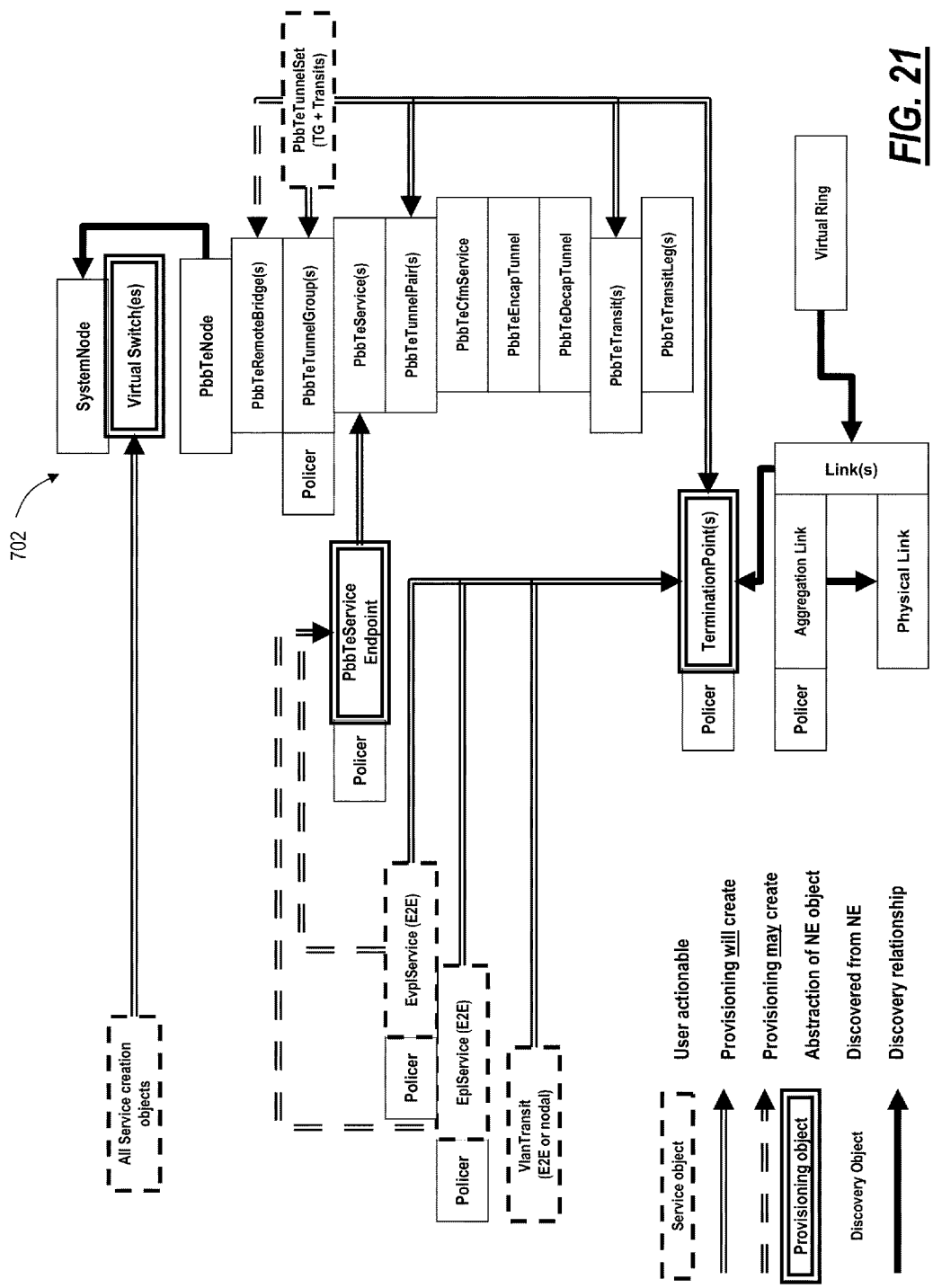
Figure 22:
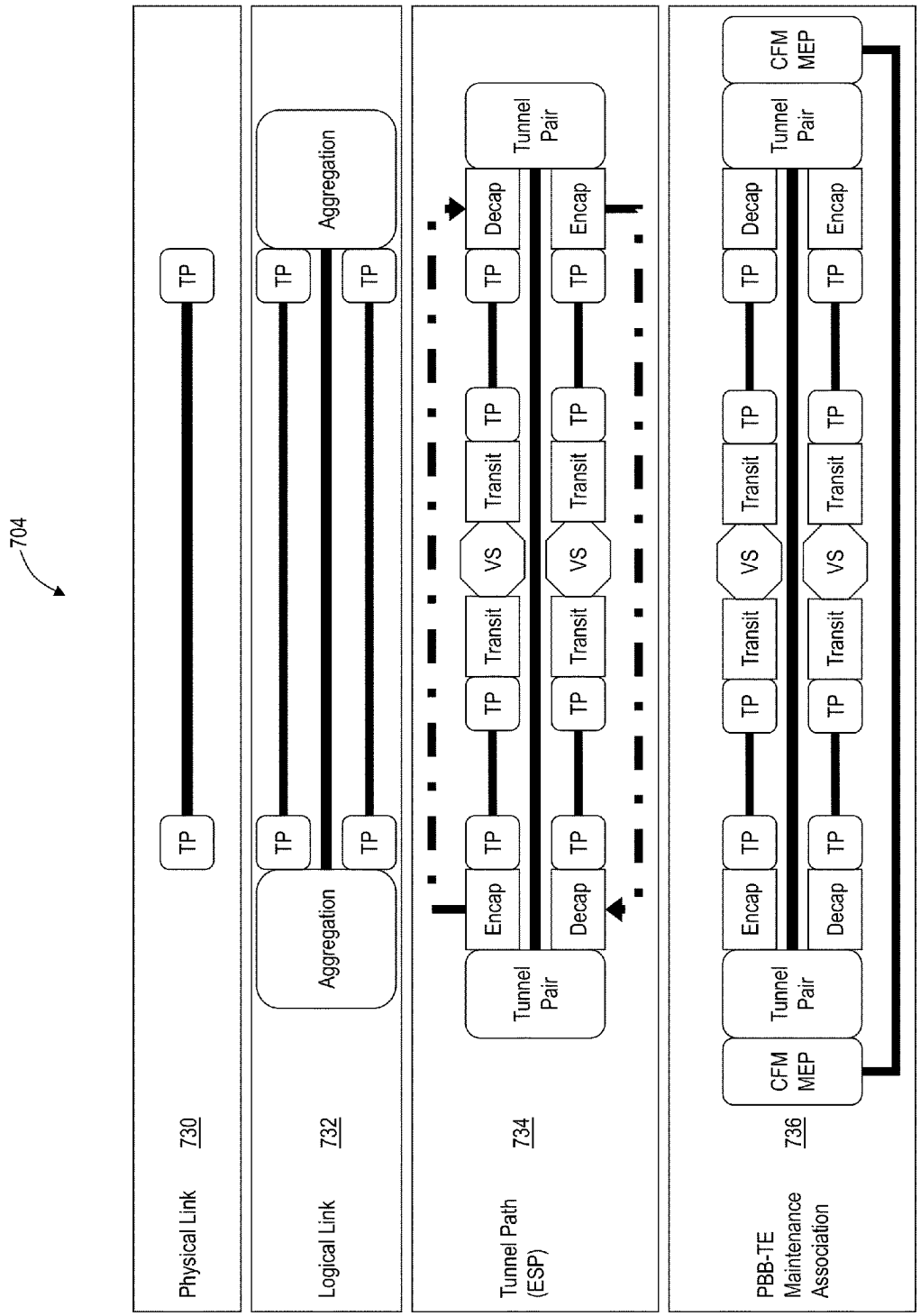

Referring to FIGS. 20-22, in exemplary embodiments, relative to a Carrier Ethernet implementation, object models are illustrated for the planning/provisioning system with the GMLP layer 30. FIG. 20 includes an object model 700 showing objects for the GMLP layer 30 and their relationship to management system 16 objects. FIG. 21 illustrates an object model 702 hierarchy, and FIG. 22 illustrates an association model 704 for an order-2 network configuration. Note, each of the models 700, 702, 704 may include Java objects managed by the planning/provisioning system. In FIG. 20, the object model 700 includes objects 710 for the GMLP layer 30, objects 712 for the framework 22, and objects 714 for extensions from the management system 16. The various objects 710 include a System Node, a PBB-TE node, a link, and a termination point. The System Node connects to an SNMP node in the objects 712, and the link connects to a topology link managed object (TopoLinkMo) in the objects 714.

In FIG. 21, the models 702 illustrate a hierarchy of object models for the objects 710 in the GMLP layer 30. For example, under the PBB-TE node object, there may be various additional objects such as PBB-TE remote bridge, PBB-TE tunnel group, PBB-TE service, PBB-TE tunnel pair, PBB-TE CFM service, PBB-TE encapsulation tunnel, PBB-TE decapsulation tunnel, PBB-TE transit, PBB-TE tunnel set, PBB-TE tunnel path, PBB-TE service end point, VPLS service end point, etc. Under the System node, there may be objects for Ethernet service which has objects for EPL service, ELAN service, EVPL service, etc. Under the Link object, there may be termination point, frame transform, base frame transform, Quality of Service transform, traffic policer, etc.

FIG. 22 illustrates the association model 704. In the planning/provisioning system with the GMLP layer 30, most of the modelling is done on the associations between objects, not the objects themselves. This enables resource consumption tracking much easier than tracking on a per-device basis, halves the number of objects to store, and more than doubles the naming complexity of the object. The association is polymorphic—Order 2—point to point and Order Other—any shared object. The model 704 is for an exemplary Order 2 system. The association model 704 has various layers including a physical link 730, a logical link 732, a tunnel path 734, and a PBB-TE maintenance association 736. The physical link 730 includes interconnected termination points (TP). The logical link 732 includes plural termination points with aggregation. The tunnel path 734 includes tunnel pairs, encapsulation/decapsulation, transit points, virtual switches (VS), etc. Finally, the maintenance association 736 in addition to the objects in the tunnel path 734 includes CFM MEP objects.

It will be appreciated that some exemplary embodiments described herein may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the two approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, and the like.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A planning system, comprising:
a processing device comprising a generic multi-layer provisioning service management layer configured to operate on any of deployed network elements and spoofed network elements to provide abstract service modeling thereon;
wherein the generic multi-layer provisioning service management layer is communicatively coupled to a user interface and a management system; and
wherein the generic multi-layer provisioning service management layer comprises a spoofing engine configured to simulate network elements and provisioning functions associated therewith.

2. The planning system of claim 1, wherein the generic multi-layer provisioning service management layer comprises:
a Service Abstraction Layer;

a Transport/Protocol Abstraction Layer; and
a Hardware Abstraction Layer.

3. The planning system of claim 2, wherein the Service Abstraction Layer is configured to interface through the user interface to provide creation of end-to-end services through an abstract model of termination points.

4. The planning system of claim 2, wherein the Transport/Protocol Abstraction Layer is configured to interface between the Service Abstraction Layer and the Hardware Abstraction Layer to enable creation of services independent of underlying transport connectivity, protocols, and encapsulations.

5. The planning system of claim 2, wherein the Hardware Abstraction Layer is configured to interface to the management system to gather network element information therefrom and to form an abstract model of each network element including termination points, system nodes, links, and aggregations.

6. The planning system of claim 2, wherein the generic multi-layer provisioning service management layer comprises:
a Service Associated Object-Oriented Relational Database providing a relational repository for services, tunnels, and device specific attributes.

7. The planning system of claim 2, wherein the spoofing engine is configured to intercept any request between the Service Abstraction Layer, the Transport/Protocol Abstraction Layer, and the Hardware Abstraction Layer related to the spoofed network elements and to provide an appropriate response thereto.

8. The planning system of claim 2, wherein the generic multi-layer provisioning service management layer comprises:
a Transaction Language-1 and Simple Network Management Protocol library providing device discovery.

9. The planning system of claim 2, wherein the generic multi-layer provisioning service management layer is configured to model networking components comprising connectivity group components, protection type components, service type components, and resource tracking components.

10. The planning system of claim 9, wherein the connectivity group components utilize graph theory for building blocks of connectivity objects with the objects comprising one of an Order 2 object and an Order !2 object.

11. The planning system of claim 9, wherein the generic multi-layer provisioning service management layer is configured to provision a Carrier Ethernet service.

12. A network system, comprising:
a planning/provisioning system;
a management system communicatively coupled to the planning/provisioning system;
at least one network element communicatively coupled to the management system; and
at least one spoofed network element managed in the planning/provisioning system;
wherein the planning/provisioning system is configured to implement a generic multi-layer provisioning service management layer configured to operate on the at least one network element and the at least one spoofed network element to provide abstract service modeling thereon; and
wherein the generic multi-layer provisioning service management layer comprises a Service Abstraction Layer, a Transport/Protocol Abstraction Layer, and a Hardware Abstraction Layer.

13. The network system of claim 12, wherein the generic multi-layer provisioning service management layer comprises:
a spoofing engine configured to simulate network elements and provisioning functions associated therewith.

14. The network system of claim 12, wherein:
the Service Abstraction Layer is configured to interface through the user interface to provide creation of end-to-end services through an abstract model of termination points;
the Transport/Protocol Abstraction Layer is configured to interface between the Service Abstraction Layer and the Hardware Abstraction Layer to enable creation of services independent of underlying transport connectivity, protocols, and encapsulations; and
the Hardware Abstraction Layer is configured to interface to the management system to gather network element information therefrom and to form an abstract model of each network element including termination points, system nodes, links, and aggregations.

15. The network system of claim 12, wherein the generic multi-layer provisioning service management layer is configured to provision a Carrier Ethernet service.

* * * * *